US008027260B2

(12) United States Patent
Venugopal et al.

(10) Patent No.: US 8,027,260 B2
(45) Date of Patent: *Sep. 27, 2011

(54) MIXED INTEGER PROGRAMMING MODEL FOR MINIMIZING LEASED ACCESS NETWORK COSTS

(75) Inventors: Nandagopal Venugopal, Plano, TX (US); Thomas P Newcomer, Rowlett, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 198 days.

This patent is subject to a terminal disclaimer.

(21) Appl. No.: 12/178,165

(22) Filed: Jul. 23, 2008

(65) Prior Publication Data

US 2010/0023610 A1    Jan. 28, 2010

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl. ......... 370/238; 370/254; 455/445; 709/229

(58) Field of Classification Search .......... 709/223–226, 709/238–244; 705/30
See application file for complete search history.

(56) References Cited

U.S. PATENT DOCUMENTS

| | | | |
|---|---|---|---|
| 5,809,282 A | 9/1998 | Cooper et al. | |
| 6,240,463 B1 * | 5/2001 | Benmohamed et al. | 709/238 |
| 7,583,795 B1 * | 9/2009 | Florence et al. | 379/133 |
| 2009/0228309 A1 * | 9/2009 | Moll | 705/7 |
| 2009/0292629 A1 * | 11/2009 | Lynch et al. | 705/30 |

OTHER PUBLICATIONS

Co-pending U.S. Appl. No. 12/413,965 entitled "Determining Collocations With an Access Transport Management System (ATMS)" by Nandagopal Venugopal et al., filed Mar. 30, 2009.

\* cited by examiner

*Primary Examiner* — Ian N Moore
*Assistant Examiner* — Jackie Zuniga

(57) ABSTRACT

A device receives network configuration information from a network, determines a logical network based on the network configuration information, and constructs a mixed integer programming (MIP) model based on the logical network. The device also calculates an optimal solution, which minimizes network costs, using the mixed integer programming (MIP) model, performs a post-optimization mapping procedure on the optimal solution to produce an optimal network configuration mapping, and outputs the optimal network configuration mapping for implementation.

23 Claims, 16 Drawing Sheets

FIG. 10

| Entrance | End Office | Source Nodes | DS3 Arc | DS1 Arc |
|---|---|---|---|---|
| ent1 | eof1_3LC | S1 | DS3 Arc1 | LCRS |
| ent1_3LC | eof1_3LD | S2 | DS3 Arc2 | internal |
| ent1_3LD | eof1_LC | S3 | DS3 Arc3 | EFAC |
| ent1_LC | eof1_LD | SS | DS3 Arc3 | incumbent |
| ent1_LD | | | | other |

1010  1020  1030  1040  1050

1060

1000

MIXED INTEGER PROGRAMMING MODEL FOR MINIMIZING LEASED ACCESS NETWORK COSTS

BACKGROUND

Telephone network operators or access providers fall in to two broad categories, local operators and long distance (LD) operators. Local access providers, typically referred to as local exchange carriers (LEC), are confined to a well defined local operating space known as a local access transport area (LATA). Within a given LATA, a local telephone company provides two main types of service, local-to-local service and local-to-long distance service. Combined facilities within a local network, used to provide access to long distance carriers, are commonly referred to as an access network. Long distance carriers access their customers by way of this local carrier-provided access network. The point of demarcation between local and long distance networks is commonly called an entrance facility. An entrance facility can exist at either the local wire center, or at a long distance point of presence (POP). An entrance facility hand-off occurring at a long distance POP is referred to as a LEC path entrance, while a hand-off at the LEC wire center is called collocation entrance. Leasing of capacity on local access networks is based on a complex tariff-based pricing model. This pricing model varies slightly from carrier to carrier, but conforms to a set of generally applied rules across all LATAs and carriers. All access network services are categorized into individual components called rate elements. Optimization and management of LEC path and collocation entrance facilities, and their associated rate elements, has traditionally been accomplished by way of a highly stepwise, spreadsheet-based manual processes.

Access transport management systems provide network engineers with core functionality to manage a nationwide access network (e.g., a telecommunications network). Access transport management systems automate the process of identifying local exchange carrier (LEC) and competitive local exchange carrier (CLEC) access circuits that have sub-optimal routes, and moving such circuits to less costly routes and/or facilities. Access transport management systems may include sets of procedures that conform to user-defined business logic. Depending on given optimization parameters, access transport management systems may execute a suitable set of procedures against each circuit in order to determine cost-saving opportunities. For example, in the case of digital signal 1 (DS1) line optimization, access transport management systems may use entrance facility (e.g., an entrance to a building for both public and private network service cables, including antenna transmission lines) spares to discover zero-mile digital signal 3 (DS3) lines, subtending DS1 lines (e.g., subtending allows a node to feed traffic to another node upstream), and/or swinging DS1 lines.

However, such an approach is a local search heuristic that provides only local optima (e.g., local minimal access transport costs and/or maximum cost savings). In other words, access transport management systems fail to guarantee global optima for access networks, and circuit moves suggested by access transport management systems may still be sub-optimal.

BRIEF DESCRIPTION OF THE DRAWINGS

FIG. 10 illustrates a diagram of a portion of an exemplary database capable of being provided in and/or managed by the device of the network depicted in FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable an access transport management system to guarantee global optima (e.g., minimal access transport costs and/or maximum cost savings) for leased access networks. The systems and/or methods may provide a comprehensive mixed integer programming (MIP) model that may capture problem characteristics of the network with mathematical formulations (e.g., variables, constraints). The MIP model may optimize large-scale access networks in reasonable computation time (e.g., within fifteen minutes at 95% optimality).

In one implementation, for example, the systems and/or methods may receive network configuration information from a network (e.g., an access network), may determine a new capacity model of the network based on the network configuration information, and may determine an entrance facility capacity model of the network based on the network configuration information. The systems and/or methods may determine an incumbent capacity model of the network based on the network configuration information, may construct a mixed integer programming (MIP) model from the determined capacity models, and may calculate an optimal solution, minimizing network costs, using the MIP model. The systems and/or methods may perform a post-optimization mapping procedure on the optimal solution to produce an optimal network configuration mapping, and may implement (e.g., within the access network) and/or store the optimal network configuration mapping.

Figure 1:
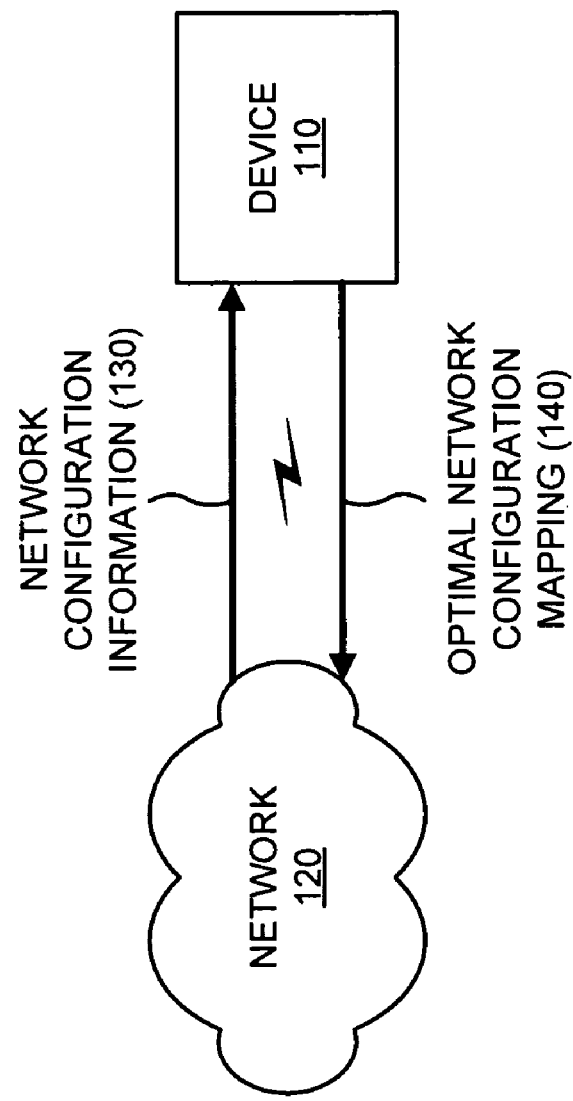
FIG. 1 depicts a diagram of an exemplary network in which systems and methods described herein may be implemented.

FIG. 1 is a diagram of an exemplary network 100 in which systems and methods described herein may be implemented. As illustrated, network 100 may include a device 110 interconnected with a network 120. Components of network 100 may interconnect via wired and/or wireless connections. A single device 110 and network 120 have been illustrated in FIG. 1 for simplicity. In practice, there may be more devices 110 and/or networks 120. Also, in some instances, one or more of the components of network 100 may perform one or more functions described as being performed by another one or more of the components of network 100.

Device 110 may include a lap top or notebook computer, a personal computer, a workstation, a server, or other types of computation or communication devices, threads or processes running on these devices, and/or objects executable by these devices. In one implementation, device 110 may include a computation or communication device that gathers, processes, searches, and/or provides information in a manner described herein. For example, device 110 may include an access transport management system that utilizes a mixed integer programming (MIP) model to optimize large-scale access networks (e.g., network 120) in reasonable computation time. Further details of device 110 are provided below in connection with, for example, FIGS. 2-10.

Network 120 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, an access network, a nationwide access network, or a combination of networks. In one implementation, network 120 may include a telecommunication network with one or more interconnected network elements. Each of the network elements may include a data transfer device, such as a gateway, a router, a switch (e.g., an asynchronous transfer mode (ATM) switch), a firewall, a network interface card (NIC), a hub, a bridge, a proxy server, an optical add-drop multiplexer (OADM), a line access multiplexer (LAM), a multiplexer, a permanent or private virtual circuit (PVC), an entrance facility, a collocation, an end office, links provided between any of the aforementioned devices, or some other type of device that processes and/or transfers data. In one example, one or more of the network elements may be capable of establishing an end-to-end path between a telephone termination point (a point at which a telephone connection reaches a customer) and a local telephone exchange.

As further shown in FIG. 1, device 110 may receive network configuration information 130 from network 120. Network configuration information 130 may include information associated with network 120, such as the number of network elements, operational states of the network elements, routing information, interconnection information (e.g., wires, cables, etc. interconnecting the network elements), cost information (e.g., costs associated with routes provided between network elements), etc. Device 110 may utilize network configuration information 130 to create a logical network that models the physical devices (e.g., network elements) and/or interconnections associated with network 120. Device 110 may map network 120 to the logical network (e.g., based on predefined rules) so that device 110 may calculate an optimal network configuration for network 120.

The logical network may include nodes (e.g., that model the network elements of network 120) and arcs (e.g., that model the interconnections between the network elements of network 120). The nodes may include a source node (e.g., a source of a network flow), a demand node (e.g., a receiver of the network flow), and/or a transshipment node (e.g., that passes the network flow between the source node and the demand node). If a segment pricing is available between a pair of nodes, the nodes may be linked by an arc that represents a possibility of establishing an access line on that segment. Arcs may serve as a carrier of network flows. The amount of network flow carried by an arc may be subject to a cost, lower bound requirements, and upper bound requirements associated with that arc. For example, a DS1 circuit may include a single commodity flow that may depart from a source node and may arrive at a demand node along a path defined by arcs.

In one implementation, device 110 may construct a mixed integer programming (MIP) model from the logical network created based on network configuration information 130. Device 110 may calculate an optimal solution (e.g., that minimizes costs associated with routing traffic (e.g., data, datagrams, etc.) by network 120) using the MIP model. For example, device 110 may determine a way to route all DS1 circuits at a least total expense using the MIP model. Device 110 may perform a post-optimization mapping procedure on the optimal solution to produce an optimal network configuration mapping 140. Optimal network configuration mapping 140 may include information for routing traffic between the network elements of network 120 in an optimal way (e.g., in a manner that minimizes access transport costs and/or maximizes cost savings). Device 110 may store optimal network configuration mapping 140, and/or, as shown in FIG. 1, may provide optimal network configuration mapping 140 to network 120. Network 120 may receive optimal network configuration mapping 140, and may implement optimal network configuration mapping 140 (e.g., via the network elements).

Figure 2:
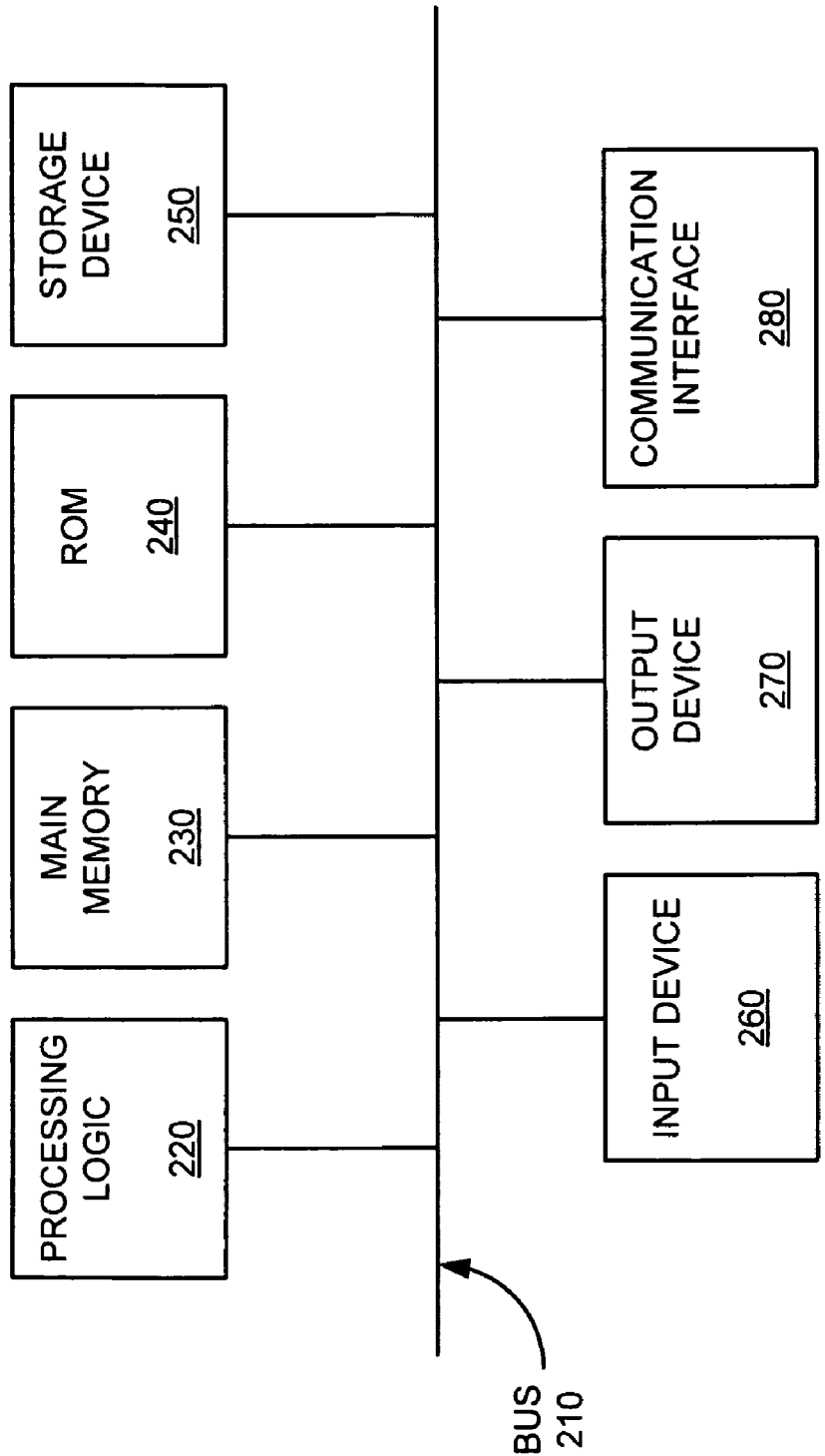
FIG. 2 illustrates exemplary components of a device of the network depicted in FIG. 1.

FIG. 2 is an exemplary diagram of a device 200 that may correspond to device 110. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 120.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
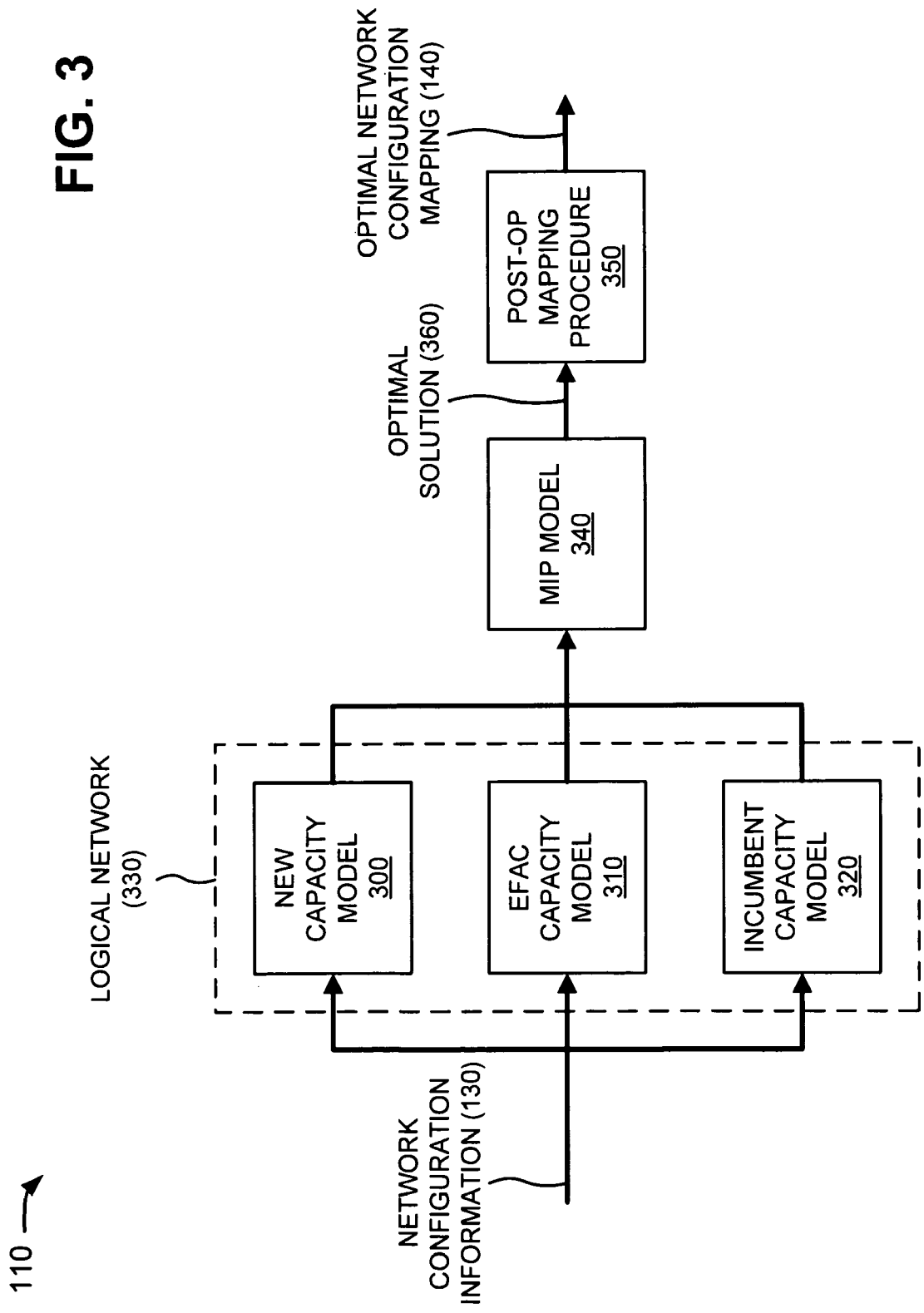
FIG. 3 depicts a diagram of exemplary functional components of the device of the network illustrated in FIG. 1.

FIG. 3 depicts a diagram of exemplary functional components of device 110. As illustrated, device 110 may include a new capacity model 300, an entrance facility (EFAC) capacity model 310, and an incumbent capacity model 320 that together form or represent a logical network 330. Device 110 may further include a mixed integer programming (MIP) model 340 and a post-optimization mapping procedure 350. The functions described in FIG. 3 may be performed by one or more of the exemplary components of device 200 depicted in FIG. 2.

New capacity model 300 may include any hardware, software, or combination of hardware and software based logic (e.g., processing logic 220) that enables device 110 to create a partial logical network (e.g., associated with network 120) that may be relevant to new capacity. For example, new capacity model 300 may receive network configuration information 130 from network 120, and may create a partial logical network (e.g., a new capacity model) that may be relevant to new capacity. New capacity model 300 may provide the new capacity partial logical network to MIP model 340. Further details of new capacity model 300 are provided below in connection with, for example, FIG. 4.

Entrance facility capacity model 310 may include any hardware, software, or combination of hardware and software based logic (e.g., processing logic 220) that enables device 110 to create a partial logical network (e.g., associated with network 120) that may be relevant to entrance facility (EFAC) capacity. For example, entrance facility capacity model 310 may receive network configuration information 130 from network 120, and may create a partial logical network (e.g., an entrance facility capacity model) that may be relevant to entrance facility capacity. Entrance facility capacity model 310 may provide the entrance facility capacity partial logical network to MIP model 340. Further details of entrance facility capacity model 310 are provided below in connection with, for example, FIG. 5.

Incumbent capacity model 320 may include any hardware, software, or combination of hardware and software based logic (e.g., processing logic 220) that enables device 110 to create a partial logical network (e.g., associated with network 120) that may be relevant to incumbent capacity (e.g., capacity of network 120 based on an existing network configuration). For example, incumbent capacity model 320 may receive network configuration information 130 from network 120, and may create a partial logical network (e.g., an incumbent capacity model) that may be relevant to incumbent capacity. Incumbent capacity model 320 may provide the incumbent capacity partial logical network to MIP model 340. Further details of incumbent capacity model 320 are provided below in connection with, for example, FIG. 6.

The new capacity model partial logical network, the entrance facility capacity model partial logical network, and the incumbent capacity model partial logical network may together form logical network 330 provided to MIP model 340.

MIP model 340 may include any hardware, software, or combination of hardware and software based logic (e.g., processing logic 220) that enables device 110 to calculate an optimal solution that minimizes operating costs associated with network 120, based on logical network 330. For example, MIP model 340 may receive logical network 330, and may calculate an optimal solution 360 based thereon. Optimal solution 360 may include a solution that minimizes costs associated with routing traffic by network 120. MIP model 340 may provide optimal solution 360 to post-optimization mapping procedure 350. Further details of MIP model 340 are provided below in connection with, for example, FIG. 7.

Post-optimization mapping procedure 350 may include any hardware, software, or combination of hardware and software based logic (e.g., processing logic 220) that enables device 110 to produce optimal network configuration mapping 140. For example, post-optimization mapping procedure 350 may receive optimal solution 360 from MIP model 340, and may calculate optimal network configuration mapping 140 based on optimal solution 360. Device 110 may store optimal network configuration mapping 140, and/or may provide optimal network configuration mapping 140 to network 120 for implementation. Further details of post-optimization mapping procedure 350 are provided below in connection with, for example, FIG. 8.

In one exemplary implementation, device 110 may implement new capacity model 300, entrance facility capacity model 310, incumbent capacity model 320, MIP model 340, and/or post-optimization mapping procedure 350 via object-oriented programming (OOP). Device 110 may implement C programs to extract physical network data (e.g., about network 120) from a database and to store the physical network data in C-style data structures. Device 110 may modify the C programs to populate components that represent logical network 330. Device 110 may further implement C++ programs to convert data stored in C-style data structures to objects of different classes (e.g., site, node, demand, arc, path, etc.). Device 110 may also utilize an ILOG CPLEX optimizer to implement new capacity model 300, entrance facility capacity model 310, incumbent capacity model 320, MIP model 340, and/or post-optimization mapping procedure 350.

Device 110 may map a physical access network (e.g., network 120) to logical network 330 in a variety of ways. In one implementation, device 110 may map a physical access network to logical network 330, whose elements may become part of problem data in MIP model 340, in the following manner. Logical network 330 may include nodes (e.g., that model the network elements of network 120) and arcs (e.g., that model the interconnections between the network elements of network 120).

The nodes may represent a site (or facility) of network 120 that may be an entrance facility, a collocation, or a plain wire center (e.g., an end office). An entrance facility and/or a collocation may include a LEC location at which a service provider is either collocated (with its equipment present at that site) or is connected to that site via a transport facility leased from the LEC. Such sites may be represented in a column of a database (e.g., provided in device 110). When constructing logical network 330, device 110 may split each site in the physical network into a set of nodes (e.g., entrance or entrance facility (ent) nodes and end office (eof) nodes). Within the network, a distinction may be made between circuits that have control at a local site and those that are controlled in a long distance site. Local controlled access circuits can use spare EFAC capacity that is controlled via a local site. Long distance (LD) controlled access circuits can use EFAC spares that are either of long distance type or local type. In order to implement this distinction, a site or facility may be split into several nodes, as explained below.

For example, device 110 may divide each entrance (ent) node into five nodes (e.g., ent, ent_3LC, ent_3LD, ent_LC, and ent_LD). Device 110 may divide each end office (eof) node into four nodes (e.g., eof_3LC, eof_3LD, eof_LC, and eof_LD). The substrings "3LC," "3LD," "LC," and "LD" may indicate a node type. For example, "3LC" may indicate a local (LC) DS3 node type, "3LD" may indicate a long distance (LD) DS3 node type, "LC" may indicate a local (LC) DS1 node type, and "LD" may indicate a long distance (LD) DS1 node type. Device 110 may also create virtual source nodes (e.g., "S1," "S2," "S3," and "SS") to balance logical network 330.

If there are local (or long distance) DS1 circuits terminating at a site (e.g., included within network 120), a local (or long distance) node residing in that site may serve as a single sink node for those circuits (e.g., flows). A count of terminating local (or long distance) circuits at that site may be used to set a demand of its local (or long distance) node. If no DS1 circuit terminates at a site, device 110 may set the demand of site's local (or long distance) node to zero.

A 3LC node may include a transshipment node. Since local infrastructure (e.g., of network 120) may support both local and long distance traffic, both local and long distance circuits may flow through a 3LC node. Therefore, 3LC nodes may be linked to local (LC) and long distance (LD) sink nodes in pairs. There may be two scenarios where a 3LC node may be used. First, a far end of a new DS3 access line may include a 3LC node. That means any DS1 circuit that may be moved onto new DS3 capacity may pass through a 3LC node. Many new DS3 access lines may be optimally placed between entrance nodes and end office nodes. Second, if there are local entrance facility spares at a site, DS1 circuits using the spares may pass through a 3LC node. In both scenarios, zero-mile local (or long distance) DS1 circuits may terminate immediately at the local (or long distance) node, while other circuits may hop to a different site where they may terminate through a subtending arc.

It may be possible to have new DS3 lines extend to an entrance facility (e.g., from a source node, such as S1), provided that such a DS3 segment cost is available. It may be assumed that the new DS3 capacity at an entrance facility may be used by DS1 circuits terminating at that entrance facility. This may be achieved by disallowing connection between the 3LC node of an entrance facility and sink nodes of other sites. Furthermore, neither subtending from end offices back to entrance facilities nor subtending from entrance facilities may be permitted.

A 3LD node may also include a transshipment node. Unlike 3LC nodes, however, 3LD nodes may be restricted in types of traffic and capacity that they may handle. For example, only long distance (LD) circuits using LD entrance facility spares may pass through 3LD nodes. These LD circuits may include zero-mile circuits and subtend circuits. A local DS1 circuit (or flow) may not enter a 3LD node, and neither may a circuit using new capacity. 3LD nodes may connect to only long distance sink nodes at either the same site or at another site (e.g., through subtending arcs).

One of the differences between an entrance facility and an end office is that an entrance facility may include one more transshipment node than an end office. A new access line (e.g., a DS3 line or a DS1 line (if re-home)) provided between entrance facilities and end offices may include a node (e.g., an ent node) as a front end. Besides the transshipment nodes and sink nodes, virtual source nodes may be included in logical network 330 to maintain an overall flow balance. Source node S1 may include an origin of new capacities, source node S2 may include an origin of entrance facility capacities, source node S3 may include an origin of incumbent capacities, and source node SS may include a super source of all capacities. Source nodes S1, S2, and S3 may be considered transshipment nodes because they may backtrack to source node SS and capacity supplies may be absorbed by source node SS. A supply at source node SS may equal to a total count of incumbent DS1 circuits in an inventory.

Logical network 330 may include two types of arcs, a DS3 arc and a DS1 arc. DS3 arcs may correspond to segments (e.g., provided in the database of device 110), and may be used to trace how many DS3 access lines ought to be on a segment. DS3 arcs may be associated with flow variables and with integer variables that represent a number of DS3 access lines. Optimal flows on arcs may help track optimal routes taken by DS1 circuits. An arc that is not a DS3 arc may be defined as a DS1 arc. Flow variables may be defined on DS1 arcs.

There may be a one-to-one relationship between a DS3 arc and an entrance facility node/end office node segment in the database of device 110. For each entrance facility node/end office node segment in the database, device 110 (e.g., via MIB model 340) may determine a cheapest segment, and/or, if the entrance facility node and the end office node are different, may create an arc between the entrance facility node and a 3LC end office node. Otherwise, both the entrance facility node and the end office node may refer to the same entrance facility, and device 110 may create an arc between a source node (e.g., S1) and a 3LC end office node.

DS1 arcs may be divided into categories, such as least cost routing systems (LCRS—for subtending or re-home) arcs, internal arcs, entrance facility arcs, incumbent arcs, and other arcs. LCRS arcs may correspond to segments in the database of device 110, and may be produced by the following logic. For a given entrance facility node/end office node pair in the database, device 110 (e.g., via MIB model 340) may determine a cheapest segment. If a node is an end office and a number of long distance spares at the end office node are greater than zero, device 110 may create a LCRS arc between a 3LD end office node and a LD entrance facility node. If a node is an entrance facility node, device 110 may create LCRS arcs between an end office node and a LC entrance facility node and between an end office node and a LD entrance facility node. Otherwise, device 110 may create LCRS arcs between a 3LC end office node and a LC entrance facility node and between a 3LC end office node and a LD entrance facility node.

To create entrance facility and incumbent arcs, device 110 may summarize arcs by entrance facilities and demand type (e.g., local or long distance) for the entrance facilities. For each entrance facility, if a number of local spares is greater than zero, device 110 may create an entrance facility arc between a source node (e.g., S2) and an entrance facility node. If a number of LD spares is greater than zero, device 110 may create an entrance facility arc between a source node (e.g., S2) and a 3LD entrance facility node. For each record in the database of device 110, depending on the demand type (e.g., local or long distance), device 110 may add an incumbent arc between a source node (e.g., S3) and a LC entrance facility node or between a source node (e.g., S3) and a LD entrance facility node. To create internal arcs, for each entrance facility node or end office node, device 110 may create internal arcs between 3LC and LC nodes, between 3LC and LD nodes, and/or between 3LC and LD nodes. Other DS1 arcs may include arcs between source nodes (e.g., between SS and S1, between SS and S2, and/or between SS and S3).

In exemplary implementations described herein, it may be assumed that a physical access network (e.g., network 120) includes two entrance facilities (ent1, ent2) and three end offices (eof1, eof2, eof3). Two DS3 segments (e.g., ent1/ent1 and ent1/eof2) may be available from the database of device 110. Three DS1 segments (e.g. ent1/eof1, ent2/eof3, and eof1/eof2) may be available from the database of device 110. Following the rules described above in connection with nodes and arcs, device 110 may map the physical access network to a logical network (e.g., logical network 330). Device 110 may automatically create three internal arcs at each site.

Although FIG. 3 shows exemplary functional components of device 110, in other implementations, device 110 may contain fewer, different, or additional functional components than depicted in FIG. 3. In still other implementations, one or more functional components of device 110 may perform one or more other tasks described as being performed by one or more other functional components of device 110.

Figure 4:
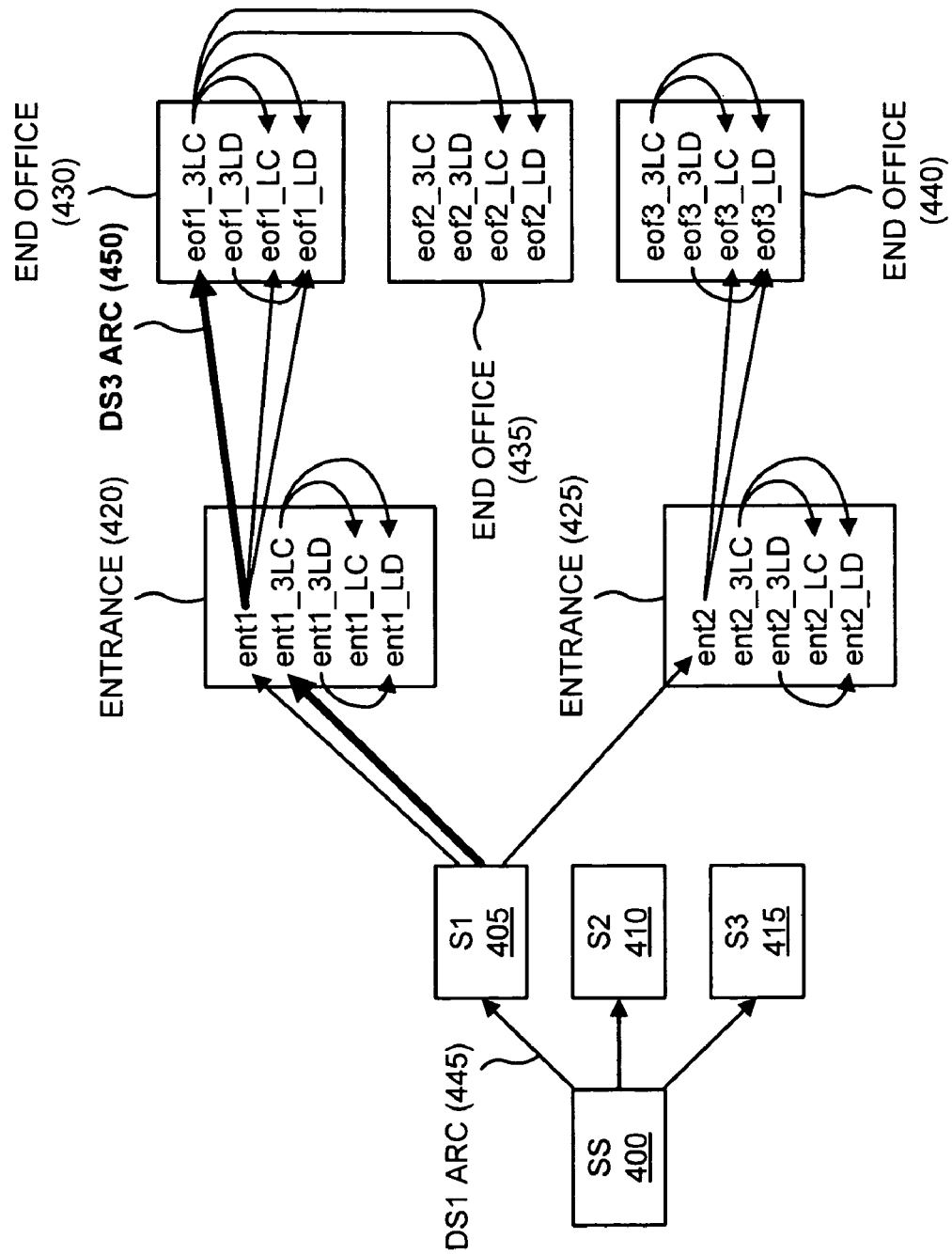
FIG. 4 illustrates a diagram of a partial logical network relevant to new capacity that may be generated by a new capacity model of the device depicted in FIG. 3.

FIG. 4 illustrates a diagram of a partial logical network relevant to new capacity that may be generated by new capacity model 300. As shown, new capacity model 300 may generate a partial logical network that includes source nodes (SS) 400, (S1) 405, (S2) 410, and (S3) 415, entrance facilities 420 and 425, and end offices (eof1) 430, (eof2) 435, and (eof3) 440. As further shown in FIG. 4, new capacity model 300 may generate a partial logical network that includes DS1 arcs 445 (e.g., non-bold arrows) and DS3 arcs 450 (e.g., bold arrows).

Source nodes (SS) 400, (S1) 405, (S2) 410, and (S3) 415 may include virtual source nodes that may be included in logical network 330 to maintain an overall flow balance. Source node (SS) 400 may include a super source of all capacities, source node (S1) 405 may include an origin of new capacities, source node (S2) 410 may include an origin of entrance facility capacities, and source node (S3) 415 may include an origin of incumbent capacities. Source nodes (S1) 405, (S2) 410, and (S3) 415 may be considered transshipment nodes because they may backtrack to source node (SS) 400 and capacity supplies may be absorbed by source node (SS) 400. A supply at source node (SS) 400 may equal to a total count of incumbent DS1 circuits in an inventory.

Entrance facilities 420 and 425 may include representations of entrance facilities provided in a physical access network (e.g., network 120). Entrance facility 420 may include an entrance facility node (ent1), a 3LC node (ent1_3LC), a 3LC node (ent1_3LC), a LC node (ent1_LC), and a LD node (ent1_LD). Entrance facility 425 may include an entrance facility node (ent2), a 3LC node (ent2_3LC), a 3LC node (ent2_3LC), a LC node (ent2_LC), and a LD node (ent2_LD).

End offices 430-440 may include representations of end offices provided in a physical access network (e.g., network 120). End office 430 may include a 3LC node (eof1_3LC), a 3LC node (eof1_3LC), a LC node (eof1_LC), and a LD node (eof1_LD). End office 435 may include a 3LC node (eof2_3LC), a 3LC node (eof2_3LC), a LC node (eof2_LC), and a LD node (eof2_LD). End office 440 may include a 3LC node (eof3_3LC), a 3LC node (eof3_3LC), a LC node (eof3_LC), and a LD node (eof3_LD).

DS1 arcs 445 may include representations of interconnections between network elements of a physical access network (e.g., network 120). DS1 arcs 445 may serve as carriers of digital signal 1 (DS1) network flows. DS1 arcs 445 may include least cost routing systems (LCRS) arcs, internal arcs, entrance facility arcs, incumbent arcs, and/or other arcs.

DS3 arcs 450 may include representations of interconnections between network elements of a physical access network (e.g., network 120). DS3 arcs 450 may server as carriers of digital signal 3 (DS3) network flows. DS3 arcs 450 may be used to trace how many DS3 access lines ought to be on a segment, and may be associated with flow variables and with integer variables that represent a number of DS3 access lines. There may be a one-to-one relationship between a DS3 arc and an entrance facility node/end office node segment in the database of device 110.

As further shown in FIG. 4, a first DS3 arc 450 may be provided between source node (S1) and a node (ent1_3LC) of entrance facility 420, and may correspond to a DS3 segment (e.g., ent1/ent1) in the physical access network. Another DS3 arc 450 may be provided between a node (ent1) of entrance facility 420 and a node (eof1_3LC) of end office 430, and may be derived from a DS3 segment (e.g., ent1/eof1) in the physical access network. In one implementation, one or more DS3 access lines may be provided over a single DS3 arc 450. A cost for each DS3 access line may include a transport cost of a corresponding segment plus a demultiplexer charge. Based on DS1 segment information, new capacity model 300 may create six DS1 subtending arcs (e.g., DS1 arcs 445) between a node (ent1) of entrance facility 420 and a node (eof1_LC) of end office 430, between a node (ent1) of entrance facility 420 and a node (eof1_LD) of end office 430, between a node (ent2) of entrance facility 425 and a node (eof3_LC) of end office 440, between a node (ent2) of entrance facility 425 and a node (eof3_LD) of end office 440, between a node (eof1_3LC) of end office 430 and a node (eof2_LC) of end office 435, and between a node (eof1_3LC) of end office 430 and a node (eof2_LD) of end office 435. A cost for a DS1 arc 445 may include a transport cost of the corresponding segment.

DS1 circuits that will use new capacity may be originated from source node (SS) 400, and may flow through source node (S1) 405. The DS1 circuits may participate in a DS3 access line (e.g., DS3 arc 450) or may be re-homed to an optimal entrance via a DS1 access line (e.g., DS1 arc 445). For example, if it is optimal to send a circuit to node (eof1_LD) of end office 430 along a path (e.g., SS-S1-ent1-eof1_LD), the circuit may re-homed to entrance node (ent1) of entrance facility 420. If the circuit is sent over a path (e.g., SS-S1-ent1-eof1_3LC-eof1_LD), the circuit may traverse a new DS3 access line (e.g., DS3 arc 450) provided between a node (ent1) of entrance facility 420 and a node (eof1_3LC) of end office 430.

Although FIG. 4 shows exemplary components of a partial logical network that may be generated by new capacity model 300, in other implementations, the partial logical network may contain fewer, different, or additional components than depicted in FIG. 4. In still other implementations, one or more components of the partial logical network that may be generated by new capacity model 300 may perform one or more other tasks described as being performed by one or more other components of the partial logical network.

Figure 5:
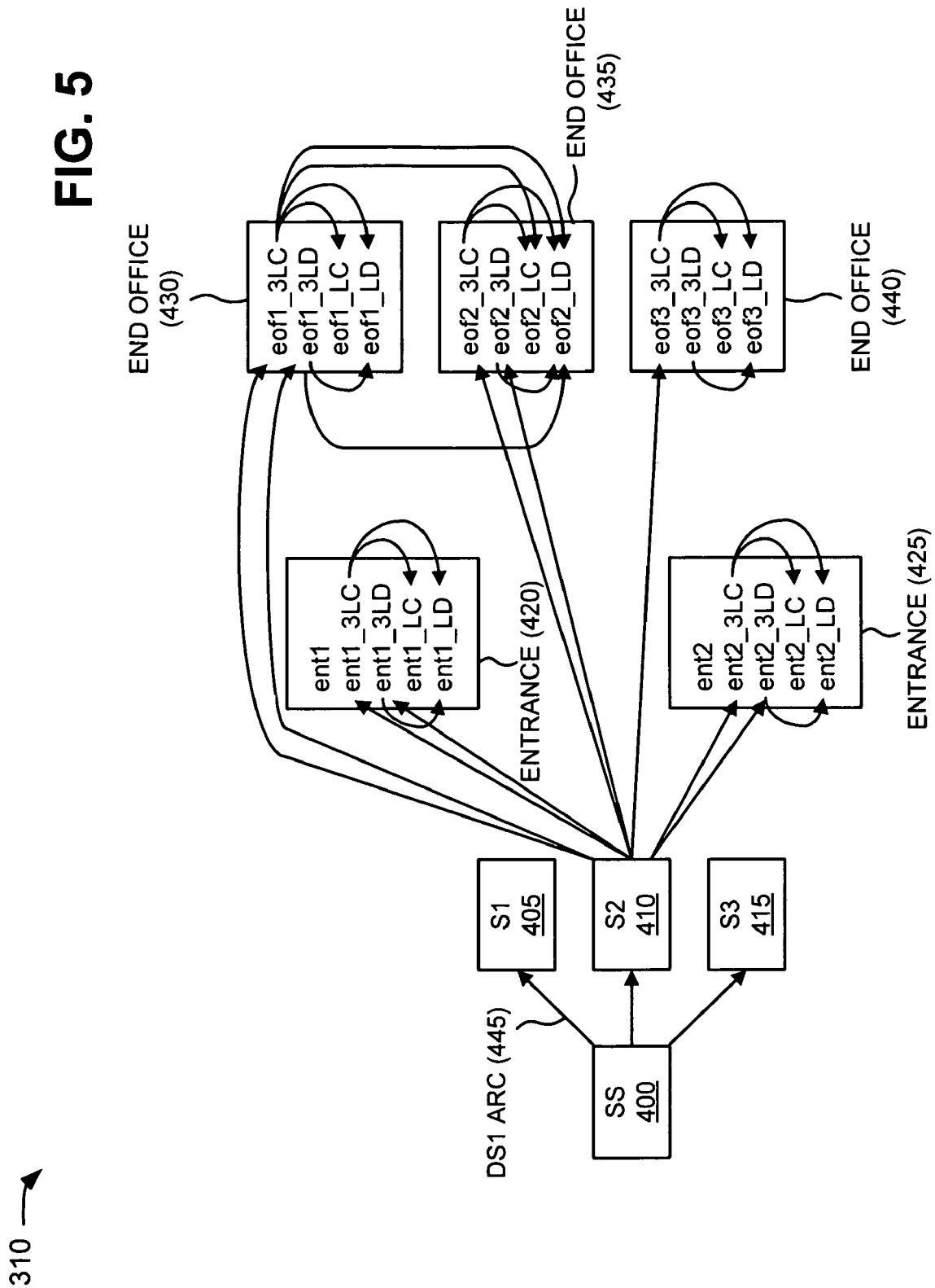
FIG. 5 depicts a diagram of a partial logical network relevant to entrance facility (EFAC) capacity that may be generated by an EFAC capacity model of the device illustrated in FIG. 3.

FIG. 5 depicts a diagram of a partial logical network relevant to entrance facility (EFAC) capacity that may be generated by EFAC capacity model 310. As illustrated, EFAC capacity model 310 may generate a partial logical network that includes source nodes (SS) 400, (S1) 405, (S2) 410, and (S3) 415, entrance facilities 420 and 425, end offices (eof1) 430, (eof2) 435, and (eof3) 440, and DS1 arcs 445 (e.g., non-bold arrows). Source nodes 400-415, entrance facilities 420/425, end offices 430-440, and DS1 arcs 445 may include the features described above in connection with FIG. 4.

As further shown in FIG. 5, source node (S2) 410 may connect to a 3LC (or 3LD) node of entrance facilities 420 and 425 if there are local (or long distance) spares available at entrance facilities 420 and 425. Internal transition arcs (e.g., provided between a node (ent1_3LC) and a node (ent1_LC), and between a node (ent1_3LC) and a node (ent1_LD)) may feed circuits on an entrance facility (e.g., entrance facility 420) to the sink (e.g., to a node (ent1_LC) or to a node (ent1_LD)). In this exemplary implementation, entrance facilities 420/425 and end offices 430-440 may include local and long distance spares except that end office 340 may not include a long distance spare. An upper bound (or maximum flow) of an entrance facility arc may equal a number of spares available at a destination node. Since entrance facility spares are free to use, costs associated with sending flows on entrance facility arcs are zero. As shown in FIG. 5, three subtending arcs from end office 430 to end office 435 (e.g., between nodes eof1_3LC and eof2_LC, nodes eof1_3LC and eof2_LD, and nodes eof1_3LC and eof2_LD) may make spares at end office 430 available to circuits terminating at end office 435. Although DS1 segments between entrance facility 420 and end office 430 and between entrance facility 425 and end office 440 exist, subtending from entrance facilities 420/425 may not be allowed. In one implementation, EFAC capacity model 310 may send circuits over usable EFAC capacity before other alternatives (e.g., other network elements of network 120).

Although FIG. 5 shows exemplary components of a partial logical network that may be generated by EFAC capacity model 310, in other implementations, the partial logical network may contain fewer, different, or additional components than depicted in FIG. 5. In still other implementations, one or more components of the partial logical network that may be generated by EFAC capacity model 310 may perform one or more other tasks described as being performed by one or more other components of the partial logical network.

Figure 6:
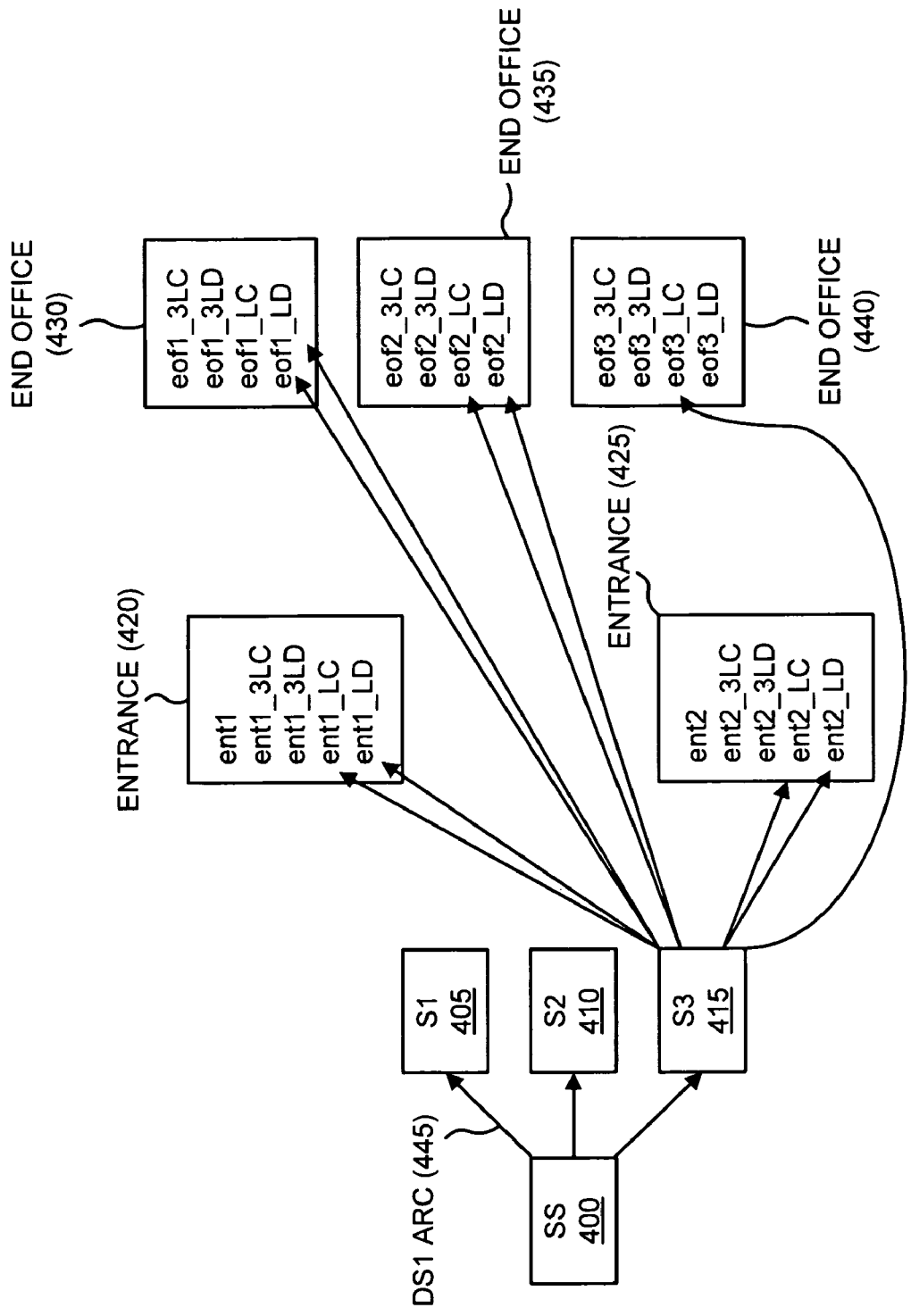
FIG. 6 illustrates a diagram of a partial logical network relevant to incumbent capacity that may be generated by an incumbent capacity model of the device depicted in FIG. 3.

FIG. 6 illustrates a diagram of a partial logical network relevant to incumbent capacity that may be generated by incumbent capacity model 320. As illustrated, incumbent capacity model 320 may generate a partial logical network that includes source nodes (SS) 400, (S1) 405, (S2) 410, and (S3) 415, entrance facilities 420 and 425, end offices (eof1) 430, (eof2) 435, (eof3) 440, and DS1 arcs 445 (e.g., non-bold arrows). Source nodes 400-415, entrance facilities 420/425, end offices 430-440, and DS1 arcs 445 may include the features described above in connection with FIG. 4.

The partial logical network generated by incumbent capacity model 320 may reflect incumbent routes of circuits and their associated costs. For each circuit, incumbent capacity model 320 may create an arc between source node (S3) 415 and a sink node that may be dedicated to the circuit. An upper bound on an incumbent arc may be equal to one. A cost of saturating an incumbent arc may include a corresponding incumbent cost. In one example, if it is assumed that there are nine circuits in an inventory, incumbent capacity model 320 may create nine incumbent arcs in the partial logical network between source node (S3) 415 and nodes of entrance facilities 420/425 and end offices 430-440. Two parallel incumbent arcs may be provided between source node (S3) 415 and a node (eof1_LD) of end office 430, which may indicate that end office 430 includes two LD circuits. Although it may seem that these two incumbent arcs are identical, they may not be interchangeable since they may be dedicated to different circuits and may have different incumbent costs. When an incumbent arc is created, incumbent capacity model 320 may tag the incumbent arc with a demand identifier of its corresponding circuit. If an incumbent arc is saturated (e.g. over-used) in optimal solution 360, incumbent capacity model 320 may maintain a matching circuit with its incumbent route.

Although FIG. 6 shows exemplary components of a partial logical network that may be generated by incumbent capacity model 320, in other implementations, the partial logical network may contain fewer, different, or additional components than depicted in FIG. 6. In still other implementations, one or more components of the partial logical network that may be generated by incumbent capacity model 320 may perform one or more other tasks described as being performed by one or more other components of the partial logical network.

Figure 7:
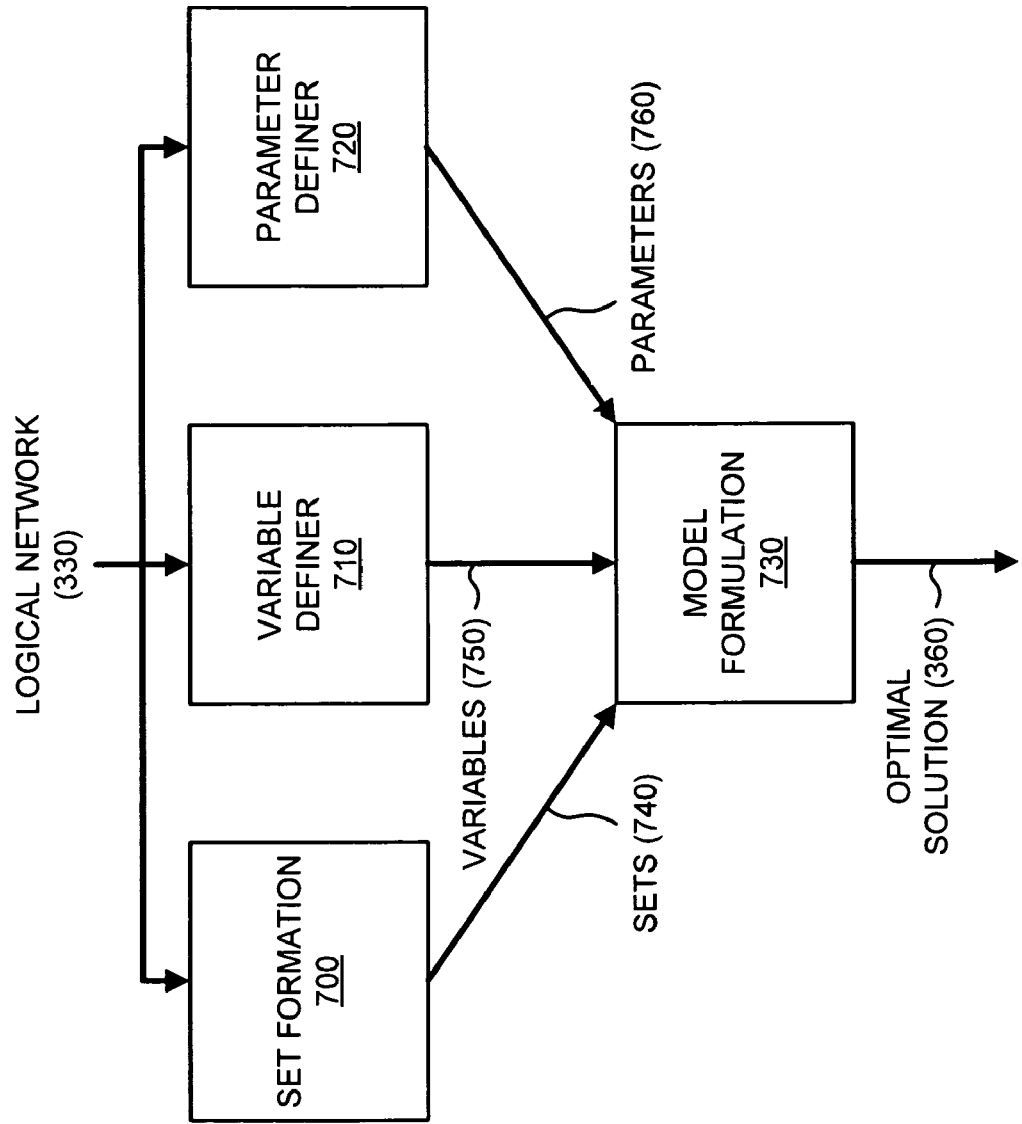
FIG. 7 depicts a diagram of exemplary functional components of a mixed integer programming (MIP) model of the device illustrated in FIG. 3.

FIG. 7 depicts a diagram of exemplary functional components of mixed integer programming (MIP) model 340. As illustrated MIP model 340 may include set formation logic 700, variable definer logic 710, parameter definer logic 720, and model formulation logic 730. In one implementation, MIP model 340 may perform access network planning as a multi-commodity network flow (MCNF) problem, and may include flow-conservation constraints associated with MCNF problems. Integer variables and side constraints may be added to MIP model 340 to recognize a cost benefit of grouping DS1 circuits on a DS3 access line versus assigning a DS1 access line to each DS1 circuit. The functions described in FIG. 7 may be performed by one or more of the exemplary components of device 200 depicted in FIG. 2.

Set formation logic 700 may include any hardware, software, or combination of hardware and software based logic (e.g., processing logic 220) that enables MIP model 340 to receive logical network 330, and to create sets 740 based on logical network 330. Each of sets 740 may include a group of network elements (e.g., as represented by logical network 330) possessing identical and/or similar attributes. Sets 740 enable MIP model 340 to express formulations in a condensed and efficient manner. In one exemplary implementation, sets 740 may include a set of nodes (N), a set of DS1 arcs ($E_{DS1}$), a set of DS3 arcs ($E_{DS3}$), a set of all arcs ($E=E_{DS1} \cup E_{DS3}$), a set of arcs arriving at a node ($I_i$, where i ∈ N, and $I_i=\{(j, i): \forall j \in N\setminus\{i\}$, and (j, i) is a valid arc}, and a set of arcs departing from a node ($O_i$, where $O_i=\{(i,j): \forall j \in N\setminus\{i\}$, and (i,j) is a valid arc}.

Variable definer logic 710 may include any hardware, software, or combination of hardware and software based logic (e.g., processing logic 220) that enables MIP model 340 to receive logical network 330, and to define variables 750 based on logical network 330. In one implementation, variables 750 may include sets of decision variables defined to capture a decision. For example, variables 750 may include continuous variables ($x_e$) indicating units of flow carried over an arc (e, where e ∈ E), and integer variables ($y_a$) representing a number of new DS3 circuits over a DS3 arc (a ∈ $E_{DS3}$).

Parameter definer logic 720 may include any hardware, software, or combination of hardware and software based logic (e.g., processing logic 220) that enables MIP model 340 to receive logical network 330, and to define parameters 760 based on logical network 330. In one exemplary implementation, parameters 760 may include a demand ($b_i$) for a node (i ∈ N), a lower bound ($l_e$) for units of flow that may be shipped on an arc (e ∈ E), an upper bound ($u_e$) for units of flow that may be shipped on an arc (e ∈ E), a cost ($c_e$) incurred for sending one unit of flow (e.g., a circuit) over a DS1 arc (e ∈ $E_{DS1}$), and a cost ($C_a$) of constructing a new DS3 access line over an arc (a ∈ $E_{DS3}$).

For source node (SS) (400), demand ($b_i$) may equal a total number of DS1 circuits. For a site terminating with local (or long distance) circuits, a demand ($b_i$) associated with its local (or long distance) nodes may include a negative of a number of terminating local (or long distance) circuits. Demand ($b_i$) may be zero for other types of nodes.

Lower bound ($l_e$) may be set to zero for all arcs. For incumbent arcs, upper bound ($u_e$) may equal one. For entrance facility arcs, upper bound ($u_e$) may equal a total of local or long distance spares provided at an entrance facility. Upper bound ($u_e$) may be infinite for other types of arcs.

For a LCRS arc, cost ($c_e$) may be equal to a corresponding DS1 segment cost. For an incumbent arc, cost ($c_e$) may be equal to an incumbent transport cost of a corresponding circuit. Cost ($c_e$) may be zero for other types of arcs. Cost ($C_a$) may be equal to a corresponding DS3 segment cost.

Model formulation logic 730 may include any hardware, software, or combination of hardware and software based logic (e.g., processing logic 220) that receives sets 740, variables 750, and parameters 760 from set formation logic 700, variable definer logic 710, and parameter definer logic 720, respectively, and formulates MIP model 340 and optimal solution 360 based on sets 740, variables 750, and parameters 760. In one exemplary implementation, model formulation logic 730 may formulate optimal solution 360 (e.g., which may minimize total access network transport cost) according to the following equation.

$$\min \sum_{e \in E_{DS1}} c_e x_e + \sum_{a \in E_{DS3}} C_a y_a.$$

Model formulation logic 730 may implement constraints on optimal solution 360. For example, model formulation logic 730 may implement flow-conservation constraints (e.g., according to the equation $$\left( \sum_{e \in I_i} x_e - \sum_{e \in O_i} x_e = b_i, \forall i \in N \right)$$

to ensure that total outgoing flows minus total incoming flows at a given node may equal to its demand. Model formulation logic 730 may implement a set of constraints that enforces multiplexer modulation restrictions (e.g., that no more than twenty-eight DS1 circuits may ride on a single DS3 access line). If a number of DS3 access lines (y) over a segment is greater than one, a flow (x) over these access lines may not exceed a product of "28" and y. If flow (x) is positive, model formulation logic 730 may seek a smallest value for y under the influence of an objective function (e.g., $x_a \leq 28 y_a$, \ a ∈ $E_{DS3}$). Model formulation logic 730 may implement other constraints (e.g., $l_e \leq x_e \leq u_e$, \ e ∈ E and $y_a \geq 0$, \ a ∈ $E_{DS3}$) that may define decision variables.

Although FIG. 7 shows exemplary functional components of MIP model 340, in other implementations, MIP model 340 may contain fewer, different, or additional functional components than depicted in FIG. 7. In still other implementations, one or more functional components of MIP model 340 may perform one or more other tasks described as being performed by one or more other functional components of MIP model 340.

Optimal solution 360 (e.g., provided by MIP model 340) may represent a cost-effective way to route circuit demands. If a certain incumbent route is sub-optimal, MIP model 340 may locate an optimal move using an entrance facility capacity or new capacity. In addition, MIP model 340 may plan new DS3 access lines if grouping sufficient DS1 circuits on such DS3 access lines could provide cost savings. However, optimal moves for some circuits may not be immediately available in optimal solution 360 since optimal solution may contain optimal flows on each arc and a number of new DS3 access lines on DS3 segments. Furthermore, optimal solution may group some circuits over certain segments shared by multiple paths (e.g., routes) that may originate from different sources. Thus, each of these circuits can be routed on one of those paths. MIP model 340 may not determine how DS1 circuits riding on a DS3 segment are assigned to DS3 access lines. Decision variables y and x over a DS3 arc may provide how many DS3 access lines (y) are needed to support a certain number of circuits (x) over that DS3 segment. Post-optimization mapping procedure 350 may be used to derive candidate physical paths on which each circuit can be moved, and to assign an appropriate path to each circuit.

Figure 8:
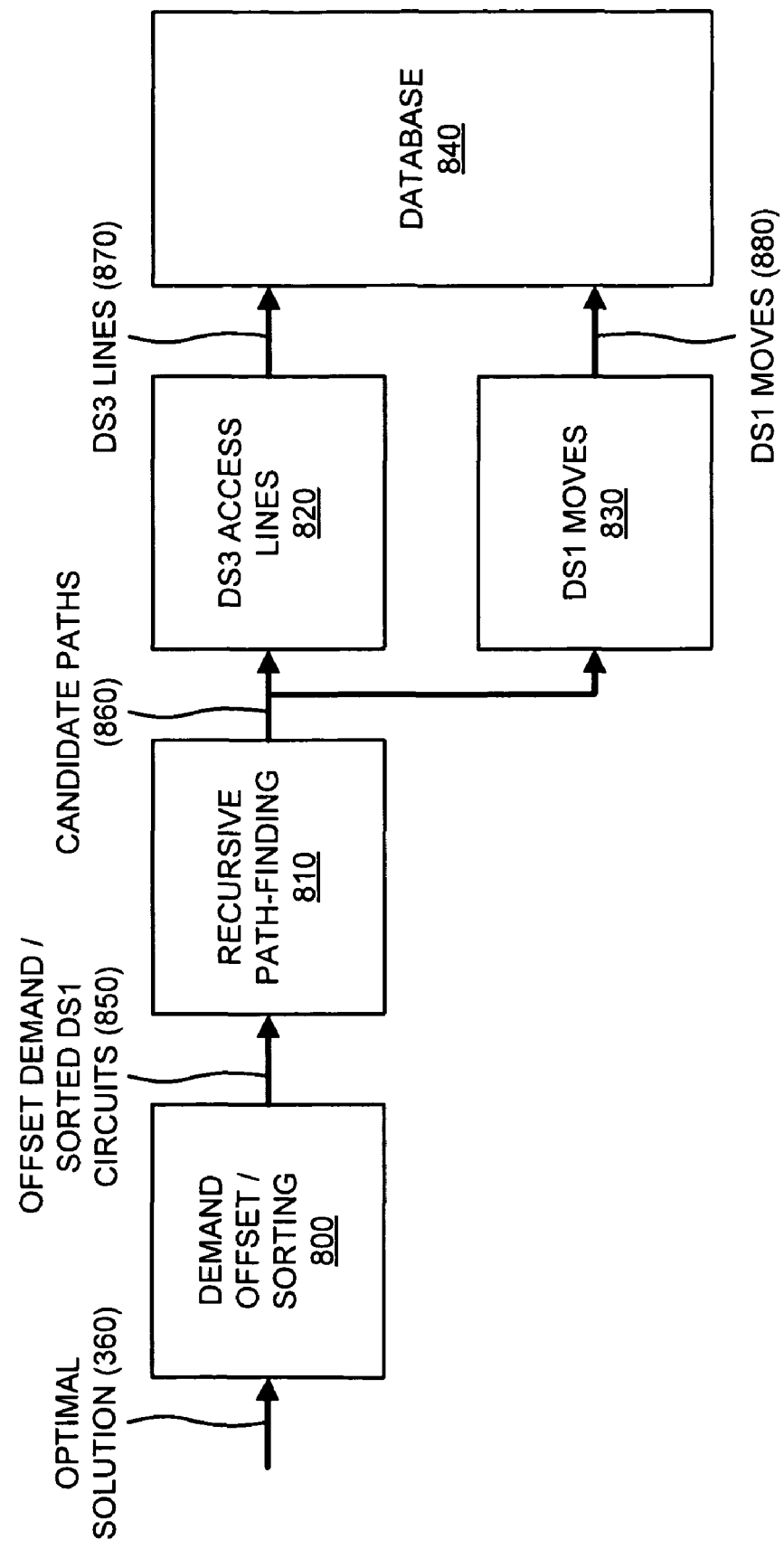
FIG. 8 illustrates a diagram of exemplary functional components of a post-optimization mapping procedure of the device depicted in FIG. 3.

FIG. 8 illustrates a diagram of exemplary functional components of post-optimization mapping procedure 350. As shown, post-optimization mapping procedure 350 may include demand offset/sorting logic 800, recursive path-finding logic 810, DS3 access lines logic 820, DS1 moves logic 830, and a database 840. The functions described in FIG. 8 may be performed by one or more of the exemplary components of device 200 depicted in FIG. 2.

Demand offset/sorting logic 800 may include any hardware, software, or combination of hardware and software based logic (e.g., processing logic 220) that receives optimal solution 360 from MIP model 340, calculates an offset demand for DS1 circuits based on optimal solution 360, and sorts the DS1 circuits based on optimal solution 360, as indicated by reference number 850 in FIG. 8. For example, if it is more advantageous not to move a DS1 circuit, a corresponding incumbent arc may be saturated in optimal solution 360. Demand offset/sorting logic 800 may exclude such circuits from further post-processing by post-optimization mapping procedure 350. Demand offset/sorting logic 800 may also update a demand at sink nodes of those circuits and a supply at source node (SS) 400. Demand offset/sorting logic 800 may move other DS1 circuits from their incumbent routes to a less costly route or facility. Before path assignment, demand offset/sorting logic 800 may sort the other DS1 circuits in a descending order based on transport cost.

Recursive path-finding logic 810 may include any hardware, software, or combination of hardware and software based logic (e.g., processing logic 220) that receives offset demand/sorted DS1 circuits 850 from demand offset/sorting logic 800, and determines candidate paths 860 based on offset demand/sorted DS1 circuits 850. Each of candidate paths 860 may include an object created for mapping that begins at a sink node, traverses a set of connected arcs where x>0, and ends at source node (SS) 400. Recursive path-finding logic 810 may begin at a sink node and may enumerate its incoming arcs where x>0. For each incoming arc (e.g., denoted by e) recursive path-finding logic 810 may complete paths by appending arc (e) to each partial path ending at a front node of arc (e). Recursive path-finding logic 810 may move to a front node of each such incoming arc, and may recursively continues the above process. Recursive path-finding logic 810 may terminate the process when it reaches source node (SS) 400, where a base partial path may be created. If a circuit can be routed on a path, recursive path-finding logic 810 may determine the path to be a candidate path for a circuit. There may be multiple candidate paths for a single circuit. If there is a unique path between a sink and a source, there may be only one candidate path. Circuits terminating at the same sink node may share the same candidate paths. Further details of the process implemented by recursive path-finding logic 810 are provided below in connection with FIG. 9.

DS3 access lines logic 820 may include any hardware, software, or combination of hardware and software based logic (e.g., processing logic 220) that receives candidate paths 860 from recursive path-finding logic 810, and assigns DS3 lines 870 based on candidate paths 860. For example, if circuits are routed on a path traversing a new DS3 arc, DS3 access line logic 820 may assign such circuits to appropriate new DS3 access lines. A cost of a path may be a total cost of DS1 arcs in the path plus a suitable derived cost of the DS3 arc (if any) in the path. DS3 access line logic 820 may create derived costs to reflect a proportioned DS3 access line (e.g., segment) cost among circuits riding on the segment. It may be assumed that (a) denotes a DS3 arc. If units of flow ($x_a$) riding on arc (a) is "28" or a multiple of "28," arc (a) may include a unique derived cost ($C_a/28$), which may indicate that circuits may incur a same cost when flowing through a saturated DS3 line. If ($0<x_a<28$), the only derived cost may be ($C_a/28$), which may be higher than when the DS3 line is saturated. If ($x_a>28$) and ($x_a\neq 28y_a$), then there may be two derived costs: ($C_a/28$) and ($C_a/[x_a-28(y_a-1)]$). In this scenario, DS3 access line logic 820 may saturate as many DS3 lines as possible and may leave one line unsaturated, which may take on the higher derived cost.

DS1 moves logic 830 may include any hardware, software, or combination of hardware and software based logic (e.g., processing logic 220) that receives candidate paths 860 from recursive path-finding logic 810, and sorts candidate paths 860 for each circuit in a descending order, based on path cost, to produce DS1 moves 880. For example, additional capacity parameters (e.g., arc capacity and path capacity) may also be needed to accomplish the mapping. These additional capacity parameters may represent an additional amount of flow that can be carried through an arc or a path, respectively, at any point of the mapping. DS1 moves logic 830 may define an initial capacity of an arc to be units of flow (x) carried by the arc. DS1 moves logic 830 may define an initial capacity of a path to be a minimum arc capacity in the path. Looping through all circuits (e.g., demands), DS1 moves logic 830 may match a next most expensive DS1 circuit with its next most costly candidate path as long as that path still has open capacity. Whenever a path (P) is assigned to a DS1 circuit, DS1 moves logic 830 may update the path's capacity as well as capacities of arcs in the path. If the path intersects with another path over one or more arcs, a drop in capacities of any of these arcs may also affect the capacity of the other path. When a path is out of capacity, DS1 moves logic 830 may determine that the path is unavailable for circuit moves, and may use a next most expensive candidate path. In the end, DS1 moves logic 830 may assign circuits that use entrance facility capacity or new capacity to one of candidate paths 860. Circuits that ride on a path traversing source node (S2) 410 may utilize the entrance facility spares. DS1 moves logic 830 may assign these circuits to existing DS3*s*.

Database 840 may include a memory device (e.g., main memory 230, ROM 240, storage device 250, etc.) that may receive DS3 lines 870 from DS3 access lines logic 820 and DS1 moves 880 from DS1 moves logic 830, and may store the information. All circuit moves in logical network 330 may be mapped back onto the physical network (e.g., network 120). DS3 lines 870, DS1 moves 880, DS3 parent information, and plan summary may be loaded into database 840, and may be utilized by network 120 to update physical routing, paths, etc. associated with network 120. In one exemplary implementation, database 840 may store network configuration information 130 and/or optimal network configuration mapping 140.

Although FIG. 8 shows exemplary functional components of post-optimization mapping procedure 350, in other implementations, post-optimization mapping procedure 350 may contain fewer, different, or additional functional components than depicted in FIG. 8. In still other implementations, one or more functional components of post-optimization mapping procedure 350 may perform one or more other tasks described as being performed by one or more other functional components of post-optimization mapping procedure 350.

Figure 9:
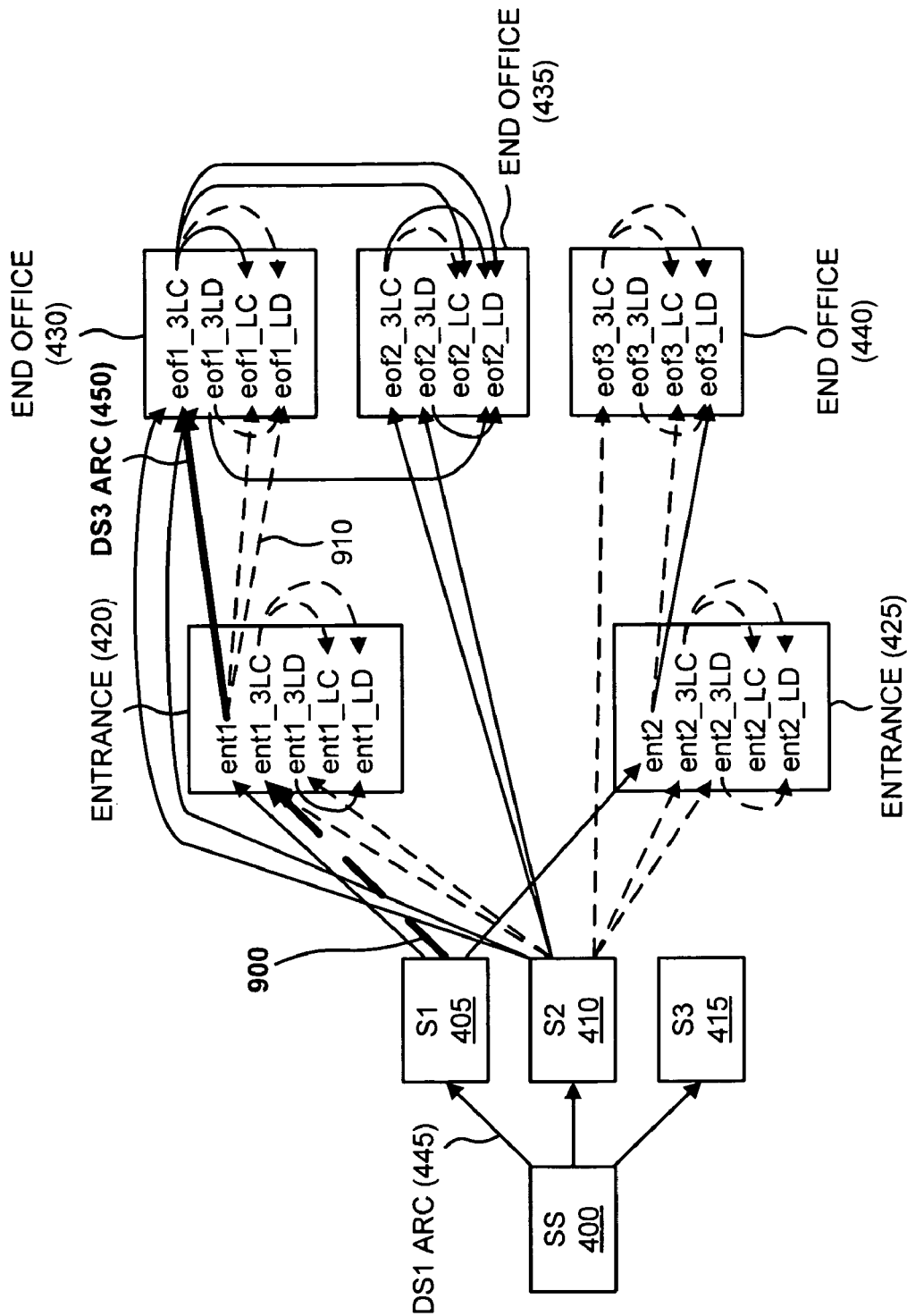
FIG. 9 depicts a diagram of a partial logical network and candidate paths that may be generated by recursive path-finding logic of the post-optimization mapping procedure illustrated in FIG. 8.

FIG. 9 depicts a diagram of a partial logical network and candidate paths that may be generated by recursive path-finding logic 810. The partial logical network generated by recursive path-finding logic 810 may include a combination of the partial logical networks depicted in FIGS. 4 and 5, with demands being adjusted (e.g., via demand offset/sorting logic 800) to offset incumbent capacity usage. As illustrated, path-finding logic 810 may generate a partial logical network that includes source nodes (SS) 400, (S1) 405, (S2) 410, and (S3) 415, entrance facilities 420 and 425, end offices (eof1) 430, (eof2) 435, and (eof3) 440, DS1 arcs (e.g., non-bold arrows), and DS3 arcs 450 (e.g., bold arrows). Source nodes 400-415, entrance facilities 420/425, end offices 430-440, DS1 arcs 445, and DS3 arcs 450 may include the features described above in connection with FIG. 4. As further shown in FIG. 9, arcs that do not carry positive flows in optimal solution 360 may be shown as dashed lines, and may include DS3 arcs 900 (e.g., dashed, bold arrows) and DS1 arcs 910 (e.g., dashed, non-bold arrows).

Recursive path-finding logic 810 may return the following exemplary candidate paths for circuits at different sink nodes. For node (eof1_LC) of end office 430, recursive path-finding logic 810 may return a first candidate path (e.g., eof1_LC-eof1_3 LC-S2-SS) and a second candidate path (e.g., eof1_LC-eof1_3LC-ent1-S1-SS). For node (eof2_LC) of end office 435, recursive path-finding logic 810 may return a first candidate path (e.g., eof2_LC-eof1_3LC-S2-SS) and a second candidate path (e.g., eof2_LC-eof1_3LC-ent1-S1-SS). For node (eof2_LD) of end office 435, recursive path-finding logic 810 may return a first candidate path (e.g., eof2_LD-eof2_3LC-S2-SS), a second candidate path (e.g., eof2_LD-eof1_3LC-S2-SS), a third candidate path (e.g., eof2_LD-eof1_3LC-S2-SS), and a fourth candidate path (e.g., eof2_LD-eof1_3LC-ent1-S1-SS). For node (eof3_LD) of end office 440, recursive path-finding logic 810 may return a candidate path (e.g., eof3_LD-ent2-S1-SS).

Although FIG. 9 shows exemplary components of a partial logical network that may be generated by recursive path-finding logic 810, in other implementations, the partial logical network may contain fewer, different, or additional components than depicted in FIG. 9. In still other implementations, one or more components of the partial logical network that may be generated by recursive path-finding logic 810 may perform one or more other tasks described as being performed by one or more other components of the partial logical network.

FIG. 10 illustrates a diagram of a portion 1000 of an exemplary database capable of being provided in and/or managed by device 110. As illustrated, database portion 1000 may include a variety of information associated with access networks. For example, database portion 1000 may include an entrance facility field 1010, an end office field 1020, a source nodes field 1030, a DS3 arc field 1040, a DS1 arc field 1050, and/or a variety of entries 1060 associated with fields 1010-1050.

Entrance facility field 1010 may include information associated with representations of entrance facilities provided in a physical access network (e.g., network 120). For example, entrance facility field 1010 may include entries for an entrance facility node (ent1), a 3LC node (ent1_3LC), a 3LC node (ent1_3LC), a LC node (ent1_LC), and a LD node (ent1_LD).

End office field 1020 may include information associated with representations of end offices provided in a physical access network (e.g., network 120). For example, end office field 1020 may include entries for a 3LC node (eof1_3LC), a 3LC node (eof1_3LC), a LC node (eof1_LC), and a LD node (eof1_LD).

Source nodes field 1030 may include information associated with virtual source nodes that may be included in logical network 330 to maintain an overall flow balance. For example, source nodes field 1030 may include entries for a source node (S1) that includes an origin of new capacities, a source node (S2) that includes an origin of entrance facility capacities, a source node (S3) that includes an origin of incumbent capacities, and a source node (SS) that includes a super source of all capacities.

DS3 arc field 1040 may include information associated with representations of DS3 interconnections provided in a physical access network (e.g., network 120). For example, DS3 arc field 1040 may indicate that an entrance facility node (ent1) (e.g., provided in entrance facility field 1010) is associated with a first DS3 arc, a 3LC node (ent1_3LC) (e.g., provided in entrance facility field 1010) is associated with a second DS3 arc, a 3LC node (ent1_3LC) (e.g., provided in entrance facility field 1010) is associated with a third DS3 arc, and a LC node (ent1_LC) (e.g., provided in entrance facility field 1010) is associated with a fourth DS3 arc.

DS1 arc field 1050 may include information associated with representations of DS1 interconnections provided in a physical access network (e.g., network 120). For example, DS1 arc field 1050 may indicate that an entrance facility node (ent1) (e.g., provided in entrance facility field 1010) is associated with a LCRS DS1 arc, a 3LC node (ent1_3LC) (e.g., provided in entrance facility field 1010) is associated with an internal DS1 arc, a 3LC node (ent1_3LC) (e.g., provided in entrance facility field 1010) is associated with an EFAC DS1 arc, a LC node (ent1_LC) (e.g., provided in entrance facility field 1010) is associated with an incumbent DS1 arc, and a LD node (ent1_LD) (e.g., provided in entrance facility field 1010) is associated with an other DS1 arc.

Although FIG. 10 shows exemplary information that may be provided in database portion 1000, in other implementations, database portion 1000 may contain fewer, different, or additional information than depicted in FIG. 10.

FIGS. 11-16 illustrate flow charts of an exemplary process 1100 for minimizing access network costs using a mixed integer programming (MIP) model, according to implementations described herein. In one implementation, process 1100 may be performed by device 110. In another implementation, some or all of process 1100 may be performed by another device or group of devices, including or excluding device 110.

Figure 11:
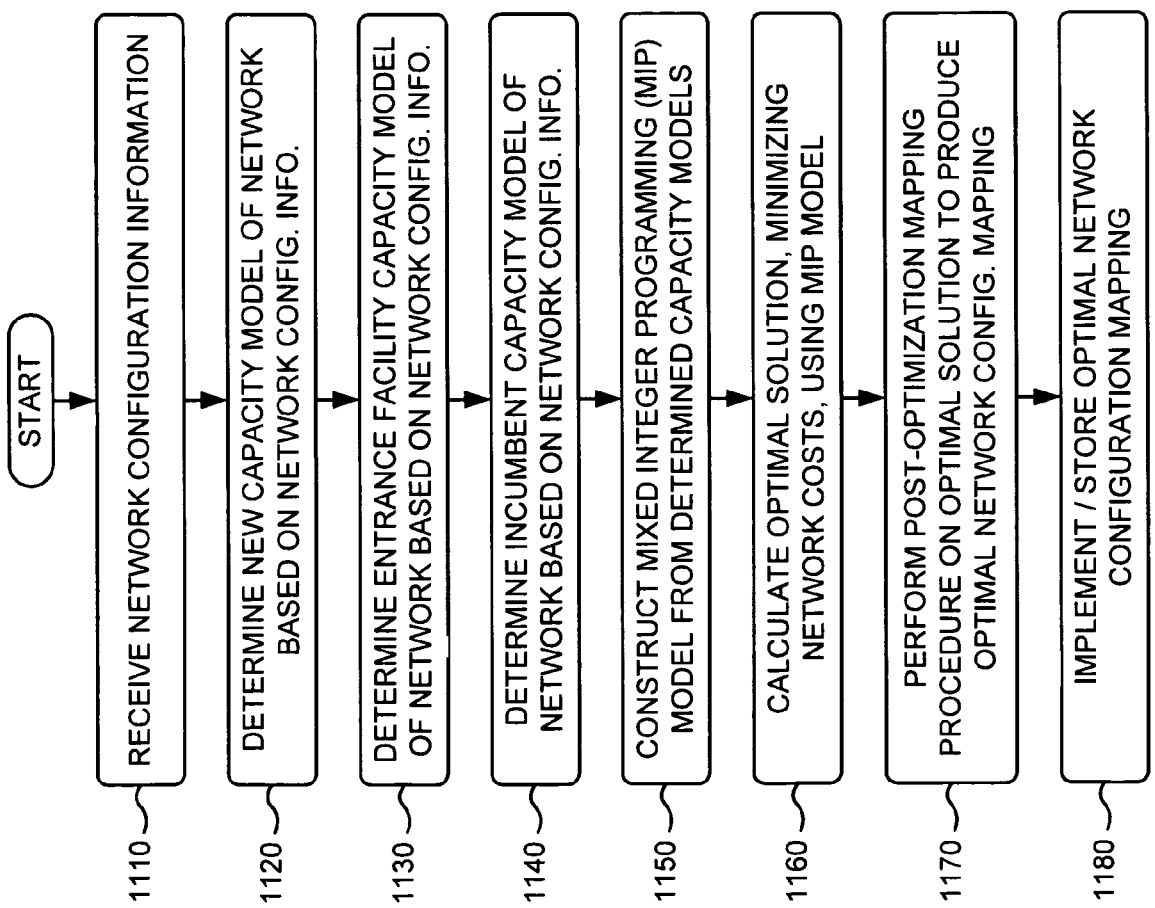
FIGS. 11-16 illustrate flow charts of an exemplary process according to implementations described herein.

As illustrated in FIG. 11, process 1100 may begin with receipt of network configuration information from a network (block 1110), determining a new capacity model of the network based on the network configuration information (block 1120), and determining an entrance facility capacity model of the network based on the network configuration information (block 1130). For example, in implementations described above in connection with FIGS. 1 and 3, device 110 may receive network configuration information 130 from network 120. Network configuration information 130 may include information associated with network 120, such as the number of network elements, operational states of the network elements, routing information, interconnection information, cost information, etc. New capacity model 300 of device 110 may receive network configuration information 130, and may create a partial logical network (e.g., a new capacity model) that may be relevant to new capacity. Entrance facility capacity model 310 of device 110 may receive network configuration information 130, and may create a partial logical network (e.g., an entrance facility capacity model) that may be relevant to entrance facility capacity.

As further shown in FIG. 11, an incumbent capacity model of the network may be determined based on the network configuration information (block 1140), a mixed integer programming (MIP) model may be constructed from the determined capacity models (block 1150), and an optimal solution, minimizing network costs, may be calculated using the MIP model (block 1160). For example, in implementations described above in connection with FIG. 3, incumbent capacity model 320 of device 110 may receive network configuration information 130 from network 120, and may create a partial logical network (e.g., an incumbent capacity model) that may be relevant to incumbent capacity. MIP model 340 of device 110 may receive a new capacity model (e.g., from new capacity model 300), an entrance facility capacity mode (e.g., from entrance facility capacity model 310), and an incumbent capacity mode (e.g., from incumbent capacity model 320) in the form of logical network 330. MIP model 340 may receive logical network 330, may construct the MIP model based on logical network 330, and may calculate optimal solution 360 using the MIP model. Optimal solution 360 may include a solution that minimizes costs associated with routing traffic by network 120.

Returning to FIG. 11, a post-optimization mapping procedure may be performed on the optimal solution to produce an optimal network configuration mapping (block 1170), and the optimal network configuration mapping may be implemented in the network and/or stored (block 1180). For example, in implementations described above in connection with FIGS. 1 and 3, post-optimization mapping procedure 350 of device 110 may receive optimal solution 360 from MIP model 340, and may calculate optimal network configuration mapping 140 based on optimal solution 360. Optimal network configuration mapping 140 may include information for routing traffic between the network elements of network 120 in an optimal way (e.g., in a manner that minimizes access transport costs and/or maximizes cost savings). Device 110 may store optimal network configuration mapping 140, and/or may provide optimal network configuration mapping 140 to network 120. Network 120 may receive optimal network configuration mapping 140, and may implement optimal network configuration mapping 140 (e.g., via the network elements).

Figure 12:
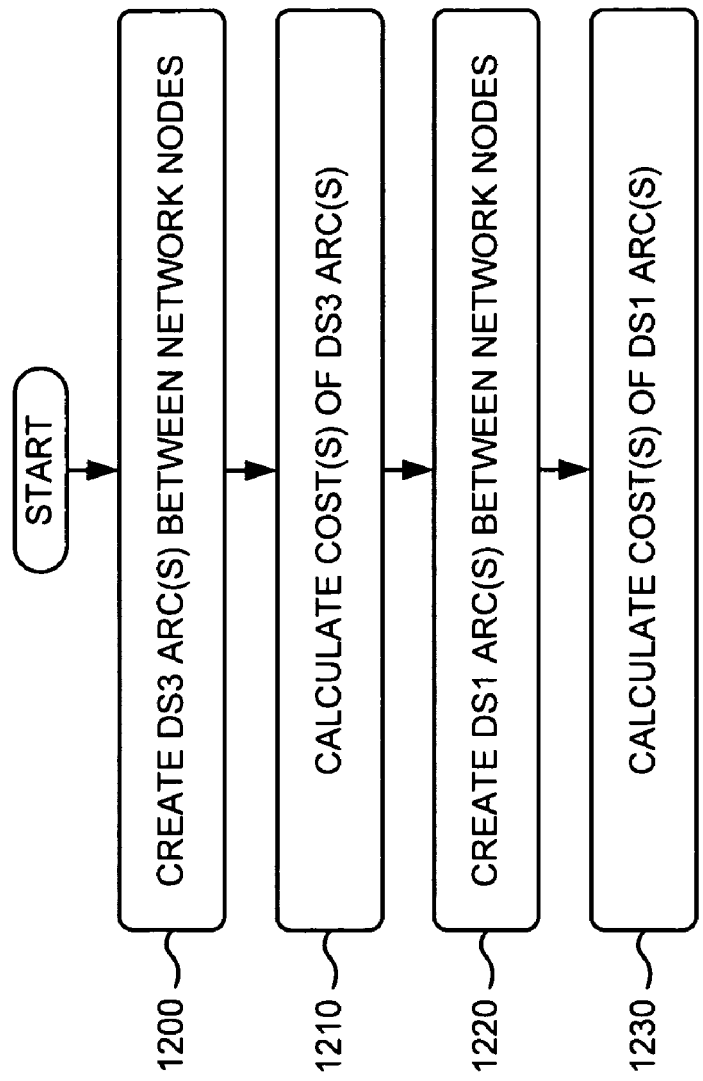

Process block 1120 may include the process blocks depicted in FIG. 12. As shown in FIG. 12, process block 1120 may include creating one or more DS3 arcs between network nodes (block 1200), calculating costs associated with the one or more DS3 arcs (block 1210), creating one or more DS1 arcs between network nodes (block 1220), and calculating costs associated with the one or more DS1 arcs (block 1230). For example, in implementations described above in connection with FIG. 4, new capacity model 300 may generate a partial logical network that includes network nodes (e.g., source nodes (SS) 400, (S1) 405, (S2) 410, and (S3) 415, entrance facilities 420 and 425, and end offices (eof1) 430, (eof2) 435, and (eof3) 440), DS1 arcs 44 (e.g. provided between the network nodes), and DS3 arcs 450 (e.g., provided between the network nodes). DS1 arcs 445 and DS3 arcs 450 may include representations of interconnections between network elements of a physical access network (e.g., network 120). A cost for a DS1 arc 445 may include a transport cost of the corresponding segment. One or more DS3 access lines may be provided over a single DS3 arc 450. A cost for each DS3 access line may include a transport cost of a corresponding segment plus a demultiplexer charge.

Figure 13:
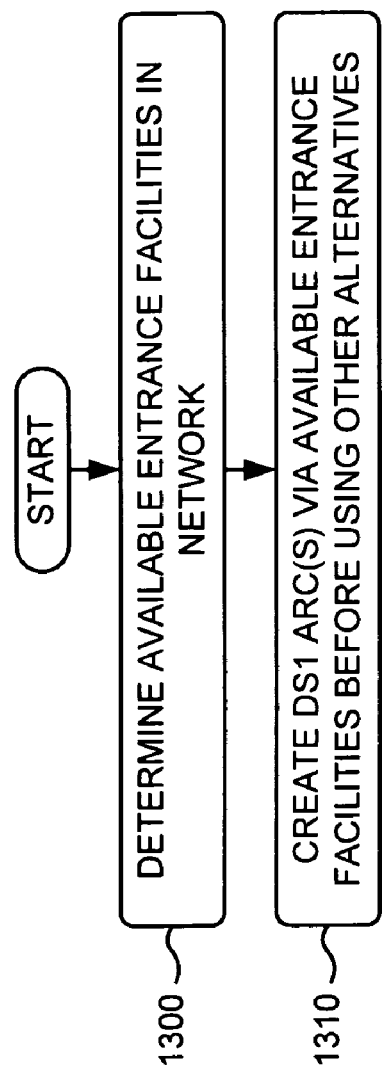

Process block 1130 may include the process blocks depicted in FIG. 13. As shown in FIG. 13, process block 1130 may include determining available entrance facilities in the network (block 1300), and creating one or more DS1 arcs via the available entrance facilities before using other alternatives (block 1310). For example, in implementations described above in connection with FIG. 5, EFAC capacity model 310 may generate a partial logical network, and may determine whether there are local (or long distance) spares available at entrance facilities 420 and 425. Entrance facilities 420/425 and end offices 430-440 may include local and long distance spares except that end office 340 may not include a long distance spare. An upper bound (or maximum flow) of an entrance facility arc may be determined (e.g., by EFAC capacity model 310) and may equal a number of spares available at a destination node. Since entrance facility spares are free to use, costs associated with sending flows on entrance facility arcs are zero. As shown in FIG. 5, three subtending arcs from end office 430 to end office 435 (e.g., between nodes eof1_3LC and eof2_LC, nodes eof1_3LC and eof2_LD, and nodes eof1_3LC and eof2_LD) may make spares at end office 430 available to circuits terminating at end office 435. In one example, EFAC capacity model 310 may send circuits over usable EFAC capacity before other alternatives (e.g., other network elements of network 120).

Figure 14:
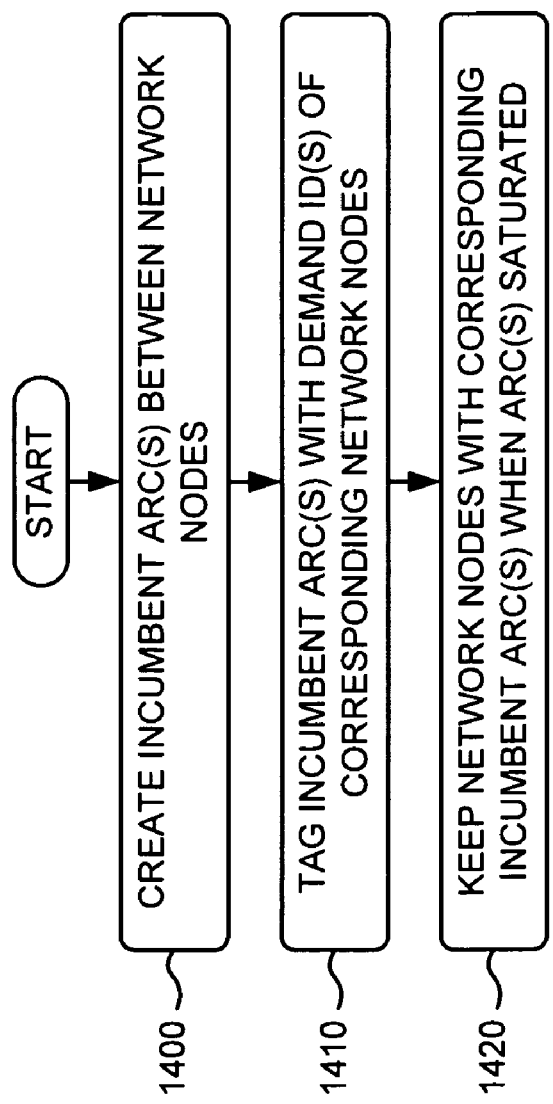

Process block 1140 may include the process blocks depicted in FIG. 14. As shown in FIG. 14, process block 1140 may include creating one or more incumbent arcs between network nodes (block 1400), tagging (or associating) the one or more incumbent arcs with demand identifiers of corresponding network nodes (block 1410), and keeping network nodes with corresponding incumbent arcs when the incumbent arcs are saturated (block 1420). For example, in implementations described above in connection with FIG. 6, for each circuit, incumbent capacity model 320 may create an arc between source node (S3) 415 and a sink node that may be dedicated to the circuit. An upper bound on an incumbent arc may be equal to one. A cost of saturating an incumbent arc may include a corresponding incumbent cost. When an incumbent arc is created, incumbent capacity model 320 may tag the incumbent arc with a demand identifier of its corresponding circuit. If an incumbent arc is saturated in optimal solution 360, incumbent capacity model 320 may maintain a matching circuit with its incumbent route.

Figure 15:
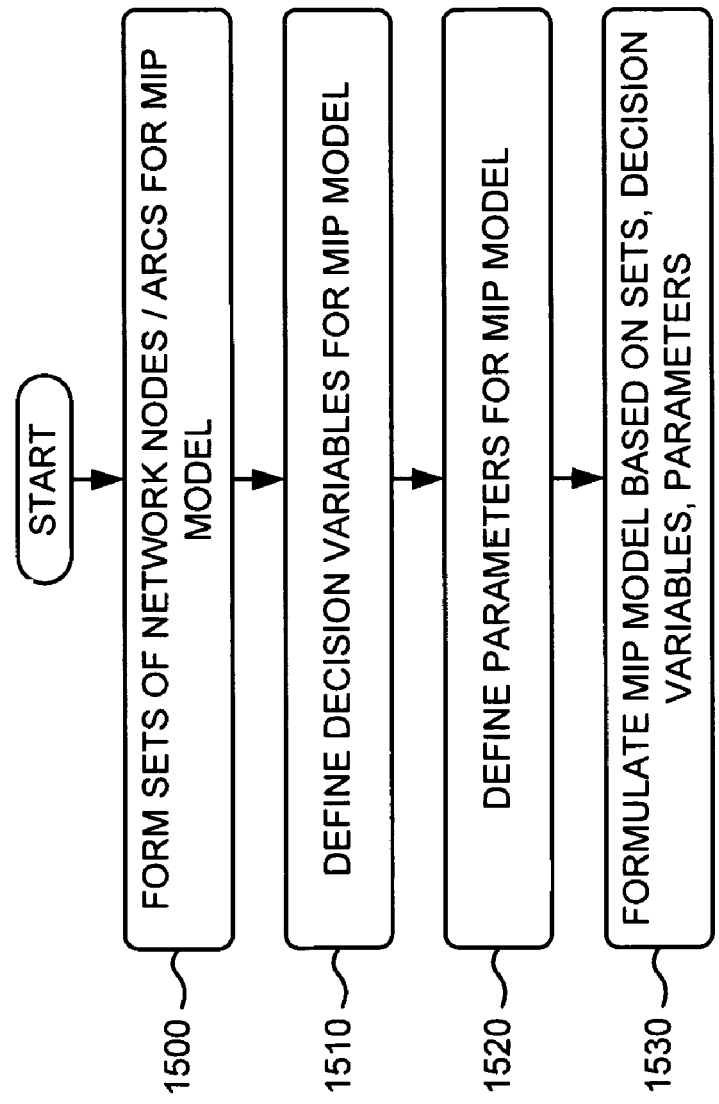

Process block 1150 may include the process blocks depicted in FIG. 15. As shown in FIG. 15, process block 1150 may include forming sets of network nodes and/or arcs for the MIP model (block 1500), defining decision variables for the MIP model (block 1510), defining parameters for the MIP model (block 1520), and formulating the MIP model based on the sets, the decision variables, and the parameters (block 1530). For example, in implementations described above in connection with FIG. 7, set formation logic 700 of device 110 may create sets 740 based on logical network 330. In one example, sets 740 may include a set of nodes, a set of DS1 arcs, a set of DS3 arcs, a set of all arcs, a set of arcs arriving at a node, and a set of arcs departing from a node. Variable definer logic 710 of device 110 may define variables 750 based on logical network 330. In one example, variables 750 may include sets of decision variables defined to capture a decision. Parameter definer logic 720 of device 110 may define parameters 760 based on logical network 330. In one example, parameters 760 may include a demand for a node, a lower bound for units of flow that may be shipped on an arc, an upper bound for units of flow that may be shipped on an arc, a cost incurred for sending one unit of flow (e.g., a circuit) over a DS1 arc, and a cost of constructing a new DS3 access line over an arc. Model formulation logic 730 of device 110 may receive sets 740, variables 750, and parameters 760, and may formulate MIP model 340 and optimal solution 360 based on sets 740, variables 750, and parameters 760.

Figure 16:
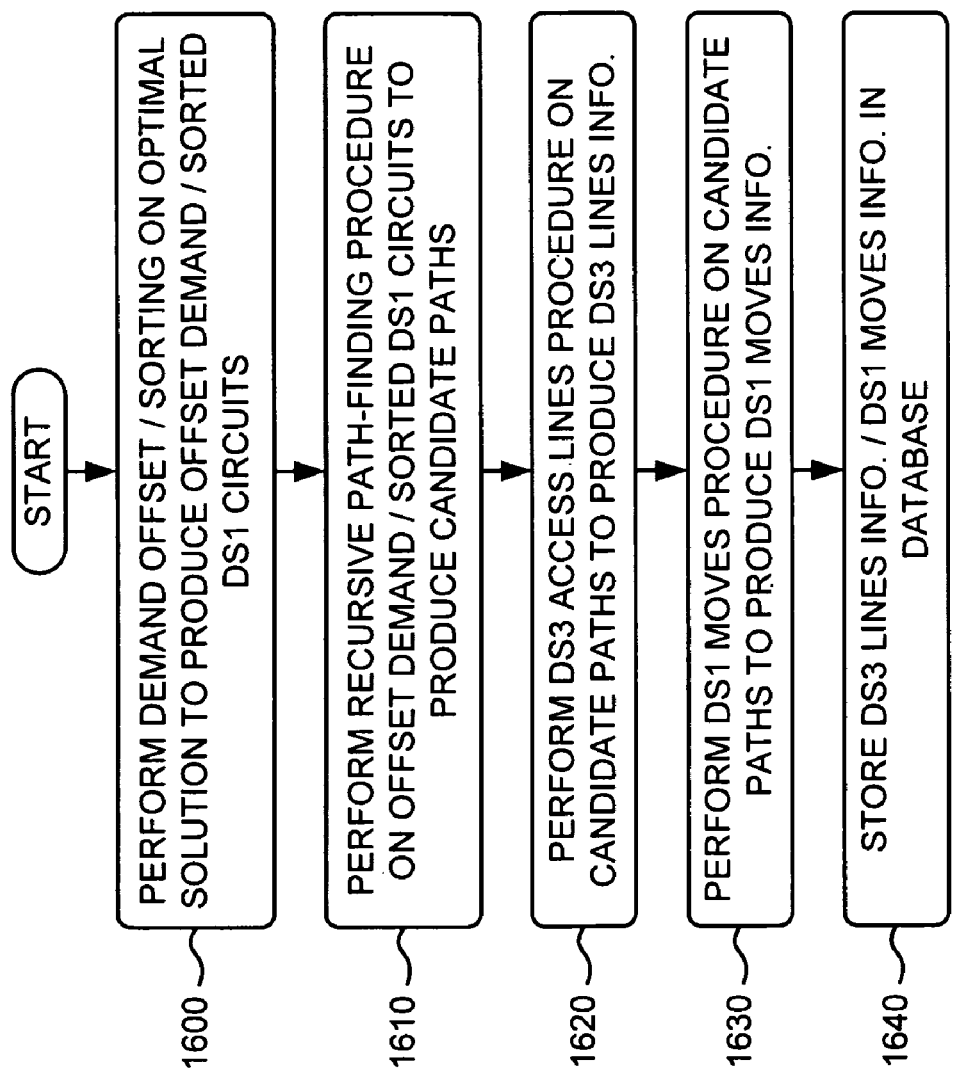

Process block 1170 may include the process blocks depicted in FIG. 16. As shown in FIG. 16, process block 1170 may include performing demand offset and/or sorting on the optimal solution to produce offset demand and/or sorted DS1 circuits (block 1600), performing a recursive path-finding procedure on the offset demand/sorted DS1 circuits to produce candidate paths (block 1610), performing a DS3 access lines procedure on the candidate paths to produce DS3 lines information (block 1620), performing a DS1 moves procedure on the candidate paths to produce DS1 moves information (block 1630), and storing the DS3 lines information and/or the DS1 moves information in a database (block 1640). For example, in implementations described above in connection with FIG. 8, demand offset/sorting logic 800 of device 110 may calculate an offset demand for DS1 circuits based on optimal solution 360, and may sort the DS1 circuits in a descending order based on transport cost. Recursive path-finding logic 810 of device 110 may determine candidate paths 860 based on offset demand/sorted DS1 circuits 850. Each of candidate paths 860 may include an object created for mapping that begins at a sink node, traverses a set of connected arcs where x>0, and ends at source node (SS) 400. If a circuit can be routed on a path, recursive path-finding logic 810 may determine the path to be a candidate path for a circuit. DS3 access lines logic 820 of device 110 may assign DS3 lines 870 based on candidate paths 860. In one example, if circuits are routed on a path traversing a new DS3 arc, DS3 access line logic 820 may assign such circuits to appropriate new DS3 access lines. DS1 moves logic 830 of device 110 may sort candidate paths 860 for each circuit in a descending order, based on path cost, to produce DS1 moves 880. Database 840 of device 110 may receive DS3 lines 870 from DS3 access lines logic 820 and DS1 moves 880 from DS1 moves logic 830, and may store the information.

Systems and/or methods described herein may receive network configuration information from a network (e.g., an access network), may determine a new capacity model of the network based on the network configuration information, and may determine an entrance facility capacity model of the network based on the network configuration information. The systems and/or methods may determine an incumbent capacity model of the network based on the network configuration information, may construct a mixed integer programming (MIP) model from the determined capacity models, and may calculate an optimal solution, minimizing network costs, using the MIP model. The systems and/or methods may perform a post-optimization mapping procedure on the optimal solution to produce an optimal network configuration mapping, and may implement (e.g., within the access network) and/or store the optimal network configuration mapping.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 11-16, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving network configuration information from a network;
   determining a logical network based on the network configuration information, where the logical network includes an entrance facility capacity model of the network based on the network configuration information;
   constructing a mixed integer programming (MIP) model based on the logical network;
   calculating an optimal solution, that minimizes network costs, using the mixed integer programming (MIP) model;
   performing a post-optimization mapping procedure on the optimal solution to produce an optimal network configuration mapping, the post-optimization mapping procedure comprising:
      performing a demand offset and sorting procedure on the optimal solution to produce offset demand/sorted digital signal 1 (DS 1) circuits,
      performing a recursive path-finding procedure on the offset demand/sorted digital signal 1 (DS1) circuits to produce candidate paths,
      performing a digital signal 3 (DS3) access lines procedure on the candidate paths to produce digital signal 3 (DS3) lines information,
      performing a digital signal 1 (DS1) moves procedure on the candidate paths to produce digital signal 1 (DS1) moves information, and
      storing the digital signal 3 (DS3) lines information and the digital signal 1 (DS1) moves information; and
   outputting the optimal network configuration mapping for implementation.

2. The computing device-implemented method of claim 1, further comprising:
   storing the optimal network configuration mapping.

3. The computing device-implemented method of claim 1, where:
   determining a logical network based on the network configuration information comprises:
      determining a new capacity model of the network based on the network configuration information, and
      determining an incumbent capacity model of the network based on the network configuration information; and
   constructing a mixed integer programming (MIP) model comprises constructing the mixed integer programming (MIP) model based on the new capacity model, the entrance facility capacity model, and the incumbent capacity model.

4. The computing device-implemented method of claim 3, where determining a new capacity model of the network comprises:
   creating a digital signal 3 (DS3) arc between a first pair of network nodes provided by the new capacity model;
   calculating a cost associated with the digital signal 3 (DS3) arc;
   creating a digital signal 1 (DS1) arc between a second pair of network nodes provided by the new capacity model; and calculating a cost associated with the digital signal 1 (DS1) arc.

5. The computing device-implemented method of claim 1, where determining an entrance facility capacity model of the network comprises:
   determining one or more available entrance facilities in the network; and
   creating one or more digital signal 1 (DS1) arcs via the one or more available entrance facilities before using other network elements of the network.

6. The computing device-implemented method of claim 3, where determining an incumbent capacity model of the network comprises:
   creating an incumbent arc between a pair of network nodes provided by the incumbent capacity model;
   associating the incumbent arc with a demand identifier associated with the pair of network nodes; and
   keeping the pair of network nodes with the incumbent arc when the arc is saturated.

7. The computing device-implemented method of claim 1, where constructing a mixed integer programming (MIP) model comprises:
   forming sets of network nodes and arcs for the mixed integer programming (MIP) model;
   defining decision variables for the mixed integer programming (MIP) model;
   defining parameters for mixed integer programming (MIP) model; and
   formulating the mixed integer programming (MIP) model based on the sets, the decision variables, and the parameters.

8. The computing device-implemented method of claim 1, where the network comprises a leased access network.

9. The computing device-implemented method of claim 1, where the network configuration information comprises one or more of:
   a number of network elements associated with the network;
   operational states of the network elements associated with the network;
   routing information associated with the network;

interconnection information associated with the network; or cost information associated with the network.

10. The computing device-implemented method of claim 1, where the computing device comprises one or more of:
 a lap top;
 a personal computer;
 a workstation; or
 a server.

11. The computing device-implemented method of claim 1, where the optimal network configuration mapping comprises information for routing traffic between network elements associated with the network in a manner that minimizes access transport costs and maximizes cost savings.

12. A device, comprising:
 a memory to store a plurality of instructions; and
 a processor to execute instructions in the memory to:
  receive network configuration information from a network,
  determine a new capacity model of the network based on the network configuration information,
  determine an entrance facility capacity model of the network based on the network configuration information,
  determine an incumbent capacity model of the network based on the network configuration information,
  construct a mixed integer programming (MIP) model based on the new capacity model, the entrance facility capacity model, and the incumbent capacity model,
  calculate an optimal solution, that minimizes network costs, using the mixed integer programming (MIP) model,
  perform a post-optimization mapping procedure on the optimal solution to produce an optimal network configuration mapping, where when the processor is configured to perform the post-optimal mapping procedure, the processor is configured to:
   perform a demand offset and sorting procedure on the optimal solution to produce offset demand/sorted digital signal 1 (DS1) circuits,
   perform a recursive path-finding procedure on the offset demand/sorted digital signal 1 (DS1) circuits to produce candidate paths,
   perform a digital signal 3 (DS3) access lines procedure on the candidate paths to produce digital signal 3 (DS3) lines information,
   perform a digital signal 1 (DS1) moves procedure on the candidate paths to produce digital signal 1 (DS1) moves information, and
   store the digital signal 3 (DS3) lines information and the digital signal 1 (DS1) moves information, and
  output the optimal network configuration mapping for implementation.

13. The device of claim 12, where the new capacity model, the entrance facility capacity model, and the incumbent capacity model comprise a logical network that models the network.

14. The device of claim 12, where the device comprises one or more of:
 a lap top,
 a personal computer,
 a workstation, or
 a server.

15. The device of claim 12, where the network comprises an access network.

16. The device of claim 12, where the network configuration information comprises one or more of:
 a number of network elements associated with the network,
 operational states of the network elements associated with the network,
 routing information associated with the network,
 interconnection information associated with the network, or
 cost information associated with the network.

17. The device of claim 12, where the optimal network configuration mapping comprises information for routing traffic between network elements associated with the network in a manner that minimizes access transport costs and maximizes cost savings.

18. The device of claim 12, where the processor is further configured to execute instructions in the memory to:
 store the optimal network configuration mapping.

19. The device of claim 12, where the processor is further configured to execute instructions in the memory to:
 create a digital signal 3 (DS3) arc between a first pair of network nodes provided by the new capacity model;
 calculate a cost associated with the digital signal 3 (DS3) arc;
 create a digital signal 1 (DS1) arc between a second pair of network nodes provided by the new capacity model; and
 calculate a cost associated with the digital signal 1 (DS1) arc.

20. The device of claim 12, where the processor is further configured to execute instructions in the memory to:
 determine one or more available entrance facilities in the network; and
 create one or more digital signal 1 (DS1) arcs via the one or more available entrance facilities before using other network elements of the network.

21. The device of claim 12, where the processor is further configured to execute instructions in the memory to:
 create an incumbent arc between a pair of network nodes provided by the incumbent capacity model;
 associate the incumbent arc with a demand identifier associated with the pair of network nodes; and
 maintain the pair of network nodes with the incumbent arc when the arc is saturated.

22. The device of claim 12, where the processor is further configured to execute instructions in the memory to:
 form sets of network nodes and arcs for the mixed integer programming (MIP) model;
 define decision variables for the mixed integer programming (MIP) model;
 define parameters for mixed integer programming (MIP) model; and
 formulate the mixed integer programming (MIP) model based on the sets, the decision variables, and the parameters.

23. A system, including an access network comprising a plurality of network elements, and a plurality of links interconnecting the network elements, the system comprising:
 a device configured to:
  receive, from the network, network configuration information associated with the plurality of network elements and the plurality of links,
  determine a new capacity model of the network based on the network configuration information,
  determine an entrance facility capacity model of the network based on the network configuration information,
  determine an incumbent capacity model of the network based on the network configuration information, construct a mixed integer programming (MIP) model based on the new capacity model, the entrance facility capacity model, and the incumbent capacity model, calculate an optimal solution, that minimizes network costs, using the mixed integer programming (MIP) model, perform a post-optimization mapping procedure on the optimal solution to produce an optimal network configuration mapping, where when the device is configured to perform the post-optimal mapping procedure, the device is configured to:

perform a demand offset and sorting procedure on the optimal solution to produce offset demand/sorted digital signal 1 (DS1) circuits, perform a recursive path-finding procedure on the offset demand/sorted digital signal 1 (DS1) circuits to produce candidate paths, perform a digital signal 3 (DS3) access lines procedure on the candidate paths to produce digital signal 3 (DS3) lines information, perform a digital signal 1 (DS1) moves procedure on the candidate paths to produce digital signal 1 (DS1) moves information, and store the digital signal 3 (DS3) lines information and the digital signal 1 (DS1) moves information, and output the optimal network configuration mapping for implementation by the plurality of network elements and the plurality of links.

\* \* \* \* \*